(12) United States Patent
Martin

(10) Patent No.: US 10,906,178 B2
(45) Date of Patent: Feb. 2, 2021

(54) SYSTEMS, DEVICES, AND METHODS FOR DISTRIBUTED GRAPHICAL MODELS IN ROBOTICS

(71) Applicant: Kindred Systems Inc., San Francisco, CA (US)

(72) Inventor: Adrian Martin, San Francisco, CA (US)

(73) Assignee: Kindred Systems Inc., San Francisco, CA (US)

(*) Notice: Subject to any disclaimer, the term of this patent is extended or adjusted under 35 U.S.C. 154(b) by 277 days.

(21) Appl. No.: 16/036,568

(22) Filed: Jul. 16, 2018

(65) Prior Publication Data
US 2020/0016748 A1    Jan. 16, 2020

(51) Int. Cl.
*H04L 29/06* (2006.01)
*B25J 9/16* (2006.01)
*B25J 9/00* (2006.01)

(52) U.S. Cl.
CPC .......... *B25J 9/1664* (2013.01); *B25J 9/0084* (2013.01)

(58) Field of Classification Search
CPC ........ B25J 9/1664; B25J 9/0084; B25J 9/163; G06F 11/3495; G06F 11/3688; G06F 21/12; G06F 21/1664; H04L 12/6418; H04L 29/06027; H04L 65/103; H04L 65/1069

USPC ................... 700/248; 370/401, 466; 379/219
See application file for complete search history.

(56) References Cited

U.S. PATENT DOCUMENTS

| | | | | |
|---|---|---|---|---|
| 2005/0149227 A1* | 7/2005 | Peters, II | ............. | G05D 1/0274 700/245 |
| 2014/0047107 A1* | 2/2014 | Maturana | ............. | G05B 19/056 709/224 |
| 2019/0069379 A1* | 2/2019 | Kastee | .................... | B64C 17/02 |
| 2019/0101985 A1* | 4/2019 | Sajda | ...................... | G06F 3/017 |

* cited by examiner

*Primary Examiner* — Dalena Tran
(74) *Attorney, Agent, or Firm* — Seed Intellectual Property Law Group LLP

(57) ABSTRACT

A distribution system (e.g., distributed robotic system) and method, may employ a plurality of agents, each agent associated with a respective set of processor-executable instructions, and a specification that defines routes amongst the agents. A first agent (e.g., a host agent) may be instantiated, associated with a first processor-based device in the distributed system. An attempt is made to locate an instance of a second agent. In response to locating the instance of the second agent, the instance of the second agent is registered with the instance of the first agent. A third agent may be instantiated, and the instance of the third agent registered with the instance of the first agent. A first route between the instance of the second agent and the instance of the third agent may be created, and a message sent between the instances of the second and the third agents.

10 Claims, 17 Drawing Sheets

SYSTEMS, DEVICES, AND METHODS FOR DISTRIBUTED GRAPHICAL MODELS IN ROBOTICS

BACKGROUND

Technical Field

The present disclosure generally relates to technical computation, and, more particularly, to distributed computation and/or computation associated with operation of robotics.

Description of the Related Art

Distributed Computing

Distributed computing includes technical arts (e.g., design, analysis, operation) associated with distributed systems. A distributed system includes a plurality of processor-based devices that are independent and interconnected, e.g., networked. The processor-based devices can be physically remote from each other. The processor-based devices communicate, and potentially coordinate toward a goal, through passed messages.

Graphical Models

Processor-executable instructions that run on a processor-based device (e.g., computer, microcontroller, and FPGA) may implement graphical models. The graphical models may represent physical systems, artificial neural networks, and the like. Graphical models can be used in the design, analysis, or test of many systems, devices, articles of manufacture, and methods.

Application Programming Interfaces

An Application Programming Interface, or "API", is a particular set of rules, formats, conventions, specifications, and instructions, that a first set of processor-executable instructions may follow to request or access and make use of computational services and resources provided by, at least, a second set of processor-executable instructions. The second set of processor-executable instructions implements the API and supports requests from the first set of processor-executable instructions. The API serves as an interface between a plurality of sets of processor-executable instructions and facilitates their interaction and/or integration.

As used herein, an API includes processor-executable instructions arranged as functions, procedures, methods, classes, or the like. At least one hardware processor interacting with an API may make use of one or more languages. For example, the API may be specified in one or more programming, scripting, or mark-up languages, such as, PHP, AJAX, HTML, XML, and JAVASCRIPT. The API may specify a low level description of how processor-readable data is laid out in, or on, tangible computer readable storage media. An API may have a specified structure for interactions between sets of processor-executable instructions. For example, the API may specify arguments that may be passed, orderings for the arguments, and the like. In general, an API defines or specifies manner in which at least one processor operates to receive, send, store, and calculate information to, from, and for a plurality of sets of processor readable instructions. Details of the definition or specification of an API affect the rate and/or efficiency at which at least one processor executes one or more of sets of processor readable instructions.

Machine Learning

A computer, which is a machine, can perform one or more related tasks where a measure defines success. The computer may learn through exposure to information that represents one or more events. Based on the information that represents the one or more events and associated measure of success the computer may change processor-executable instructions associated with performing the one or more related tasks. If, after the change, the computer improves under the measure then the computer has learned. Further, the computer learns (e.g., updates the processor-executable instructions) absent a human operator updating the processor-executable instructions (e.g., updates via imperative programming).

Artificial Neural Networks

Artificial neural networks (ANNs) are a family of machine learning models inspired by biological neural networks. The models include methods for learning and associated networks. A network includes units connected by links and is similar to a graph with units in place of nodes, and weighted edges called links in place of unweighted edges. A unit has a non-linear response to an aggregate value for a set of inputs. The inputs are the responses of other units as mediated by weighted edges and/or a reference or bias unit. Traditionally, and to an immaterial scaling factor, a unit has as its state, a value between and including minus one and one, or zero and one. The term unit distinguishes artificial neural networks from biological neural networks where neurons is a term of art. These ANN are simulated using techniques from technical fields including computing, applied statistics, and signal processing. The simulation causes an ANN to learn over input. The processor-based devices effect evolution or adaptation of weights for the units and edges; and/or removal of units or links. These weights, also called parameters, are used in later computing including when simulating the ANNs' response to inputs. Both learning and application of learning of ANN require computational resources of at least time and processor-readable storage media space. There are many technical problems which prevent various systems, devices, articles, and methods from operating ANN with reduced resources.

Robots

A robot is an electro-mechanical machine controlled by circuitry and/or a processor (e.g., integrated circuit) executing processor-executable instructions; a human operator controllable electro-mechanical machine; a robotic subsystem (or apparatus) of another machine including a robot; or the like.

BRIEF SUMMARY

A distributed system may comprise hosts, robots, computer systems, roles, routes, and agents. Hosts are the physical processor-based devices that process data such as computer systems and robots. Hosts can be local or remote, stationary or mobile (e.g., included in robots) units. Robots are the tangible machines including sensors to provide information about a physical environment of robots. Robot also have motion and manipulation subsystems to interact with the physical environment. Agents are one or more sets of processor-readable and -executable instructions, which when executed causes the hosts and robots to process data, interact, and the like. Agents are instantiated when needed by a system, e.g., a robotic system, a distributed system, and communicate with each other, the hosts, and the robots via one or more communications channels. A role is a task, activity, or function that may be performed, assumed, or filled by an agent. Routes are disposed between two or more agents and bring the same into communication with each other.

A method of operation of a distributed system, including at least one processor, and a first processor-based device in communication with the at least one processor, may be summarized as including receiving, by the at least one processor, processor-readable information which includes a specification for a plurality of agents, wherein the plurality of agents comprises a first agent, a second agent, and at least a third agent, a plurality of sets of processor-executable instructions wherein a respective agent in the plurality of agents is associated with a respective set of processor-executable instructions in the plurality of sets of processor-executable instructions, and a specification for a plurality of routes amongst the plurality of agents, wherein the plurality of routes comprises a first route; causing, by the at least one processor, creation of an instance of the first agent wherein the first agent is a host agent, and the instance of the first agent is associated with first processor-based device in the distributed system; attempting to locate, by the at least one processor, an instance of the second agent; if the instance of the second agent is located, registering, by the at least one processor, the instance of the second agent with the instance of the first agent; causing, by the at least one processor, creation of an instance of the third agent; registering, by the at least one processor, the instance of the third agent with the instance of the first agent; causing, by the at least one processor, creation of an instance of the first route between the instance of the second agent and the instance of the third agent; and generating, by the at least one processor, a signal that includes information which specifies a message between the instance of the second agent and the instance of the third agent.

The method may further include if the instance of the second agent is not located, causing, by the at least one processor, creation of the instance of the second agent; and registering, by the at least one processor, the instance of the second agent with the instance of the first agent.

The distributed system may further include a second processor-based device in communication with the at least one processor, and the plurality of agents may further include a fourth agent and a fifth agent, and the method may further include causing, by the at least one processor, creation of an instance of the fourth agent, wherein the fourth agent is a host agent associated with the second processor-based device; causing, by the at least one processor, creation of an instance of the fifth agent; and registering, by the at least one processor, the instance of the fifth agent with the instance of the fourth agent.

The method may further include receiving, by the at least one processor, a request to cause the creation of the instance of the second agent prior to a request to cause the creation of the instance of the first agent; causing, by the at least one processor, creation of an instance of the second agent; attempting to locate, by the at least one processor, the instance of the first agent; and if the instance of the second agent is not located, causing, by the at least one processor, creation of an instance of the first agent. At least one of the instance of the first agent, the instance of the second agent, or the instance of the third agent may be a worker agent. The instance of the second agent may be a hardware agent and the instance of the third agent may be a software agent.

The method may further include detecting, by the at least one processor, the instance of the second agent, or the instance of the third agent, has malfunctioned; and generating, by the at least one processor, a signal that includes information that specifies that the instance of the second agent, or the instance of the second agent, has crashed.

The method may further include generating, by the at least one processor, a signal that includes information that represents existence of the instance of the second agent, and existence of the instance of the third agent.

The second agent may include a label that includes a label value, and the third agent may include the label that includes the label value, and the method may further include performing, by the at least one processor, an action on the instance of the second agent and an action the instance of the third agent, wherein the action is selected from the group consisting of starting, by the at least one processor, a plurality of instances of agents, each instance of agent in the plurality of instances of agents includes the label which comprises the label value; stopping, by the at least one processor, a plurality of instances of agents, each instance of agent in the plurality of instances of agents includes the label which comprises the label value; coordinating, by the at least one processor, communication amongst a plurality of instances of agents, each instance of agent in the plurality of instances of agents includes the label which comprises the label value; coordinating, by the at least one processor, a plurality of instances of agents, each instance of agent in the plurality of instances of agents includes the label which comprises the label value; and updating, by the at least one processor, a plurality of instances of agents, each instance of agent in the plurality of instances of agents includes the label which comprises the label value.

The method may further include receiving, by at least one processor, event information that represents an event; receiving, by at least one processor, the event information by the instance of the second agent; sending, by at least one processor, the event information to the instance of the third agent; and processing, by at least one processor, the event information.

Processing the event information may include at least one action selected from the group of actions consisting of in response to execution by the at least one processor of a first set of processor-executable instructions included in the plurality of sets of processor-executable instructions and associated with the instance of the second agent, processing the event information; and in response to execution by the at least one processor of a second set of processor-executable instructions included in the plurality of sets of processor-executable instructions and associated with the instance of the third agent, processing the event information.

The instance of the second agent may include a variable, and attempting to locate the instance of the host agent, may further include attempting to locate, by the at least one processor, the instance of the host agent that includes the variable set to a first value.

The second agent or the third agent may include another plurality of agents and at least one route amongst the other plurality of agents.

A respective agent in the plurality of agents may include an input terminal and an output terminal.

A system may be summarized as including at least one processor; at least one non-transitory computer-readable storage media in communication with the at last one processor, and which stores at least one of processor-executable instructions or data thereon which when executed causes the at least one processor to define a first plurality of agents, wherein a respective agent in the first plurality of agents can be in an active state or an inactive state, define a second plurality of agents, wherein a respective agent in the second plurality of agents can be in an active state or an inactive state, define a third plurality of agents, wherein a respective agent in the third plurality of agents can be in an active state or an inactive state, define a first plurality of routes disposed between, providing communication between, the first plurality of agents and the second plurality of agents, wherein a respective agent in the first plurality of routes can be in an active state or an inactive state, define a second plurality of routes disposed between, providing communication between, the third plurality of agents and the second plurality of agents, wherein a respective agent in the second plurality of routes can be in an active state or an inactive state, receive information that specifies a requested plurality of agents to change to a requested state wherein the requested state is an active state or an inactive state, and the first plurality of agents includes the requested plurality of agents or the third plurality of agents includes the requested plurality of agents, change the requested plurality of agents to the requested state, dynamically change the state of the first plurality of routes, the second plurality of routes, or the first plurality of routes and the second plurality of routes, and send event information through the first plurality of routes, or the a second plurality of routes.

The system may further include a first processor-based device including a first processor; a second processor-based device including a second processor; and wherein the at least one processor includes the first processor, and the second processor. The first processor-based device may be a robot; and the second processor-based device may be an operator interface.

When executed, the processor-executable instructions may further cause the at least one processor to define a first host agent for the first processor-based device; and define a second host agent for the second processor-based device.

When executed, the processor-executable instructions may further cause the at least one processor to attempt to locate the first plurality of agents.

When executed, the processor-executable instructions may further cause the at least one processor to if the at least one processor does not locate the first plurality of agents, start the first plurality of agents.

When executed, the processor-executable instructions may further cause the at least one processor to have the first plurality of agents to fill a first at least one role; have the second plurality of agents to fill a second at least one role; and have the third plurality of agents to fill a third at least one role.

When executed, the processor-executable instructions may further cause the at least one processor to define a blueprint including information that specifies the first at least one role, the second at least one role, and the third at least one role.

When executed, the processor-executable instructions may further cause the at least one processor to define a supervisor agent for the first plurality of agents, the second plurality of agents, or the third plurality of agents.

When executed, the processor-executable instructions may further cause the at least one processor to receive event information that represents an event; send the event information to at least one of the first plurality of agents, the second plurality of agents, or the third plurality of agents; and process the event information.

A system may be summarized as including a plurality of hardware processors that includes a first hardware processor, and a second hardware processor; at least one non-transitory computer-readable storage media in communication with the at last one processor, and which stores processor-executable instructions which when executed causes the plurality of hardware processors to define a blueprint that includes a plurality of roles and a plurality of routes, start a blueprint supervisor agent for the blueprint; have a plurality of agents fill the plurality of roles, wherein a respective agent in the plurality of agents fill at least a respective role in the plurality of roles, wherein plurality of agents includes: a first at least one agent, and a second at least one agent, cause the plurality of agents to be brought into communication with the blueprint supervisor agent; cause a plurality of host agents to start, wherein plurality of host agents includes a first host agent, wherein the first host agent runs on the first hardware processor and is in communication with the at least one agent, and a second host agent, wherein the first host agent runs on the second hardware processor and is in communication with the second at least one agent; and receive, at the first host agent, at least one registration request from the first at least one agent; receive, at the second host agent, at least one registration request from the second at least one agent.

The plurality of roles may include a first element for a first role, the first element including a first output terminal; a second element for a second role, the second element including a first input terminal and a second output terminal; and a third element for a third role, the third element including a second input terminal. The first element, the second element, or the third element may be selected from the group consisting of a role, and an assembly. The plurality of routes may include a first route that brings the first output terminal into communication with the first input terminal; and a second route that brings the second output terminal into communication with the second input terminal. The plurality of agents may include a first agent, to perform at least the first role; a second agent, to perform at least the second role; and a third agent, to perform at least the third role.

When executed, the processor-executable instructions may further cause the plurality of processors to attempt to locate the first at least one agent.

When executed, the processor-executable instructions may further cause the plurality of processors to, if the plurality of processors does not locate the first at least one agent, start the first at least one agent. The plurality of roles and the plurality of routes included in the blueprint may be arranged as a graph.

The system may further include a robot, wherein the first hardware processor is included in the robot.

The system may further include an operator interface, wherein the second hardware processor is included in the operator interface.

When executed, the processor-executable instructions may further cause the plurality of processors to dynamically update a first at least one route the plurality of routes to an inactive state; and dynamically update a second at least one route the plurality of routes to an active state.

When executed, the processor-executable instructions may further cause the plurality of processors to define a registry of agents including processor-readable information that represents the status of at least one agent; and update the registry of agents.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with machine learning and/or robotics, such as processors, sensors, storage devices, and network interfaces, have not been shown or described in detail to avoid unnecessarily obscuring descriptions of the disclosed embodiments.

Unless the context requires otherwise, throughout the specification and claims which follow, the word "comprise" and variations thereof, such as, "comprises" and "comprising" are to be construed in an open, inclusive sense, that is as "including, but not limited to".

Reference throughout this specification to "one", "an", or "another" applied to "embodiment", "example", or "implementation" means that a particular referent feature, structure, or characteristic described in connection with the embodiment, example, or implementation is included in at least one embodiment, example, or implementation. Thus, the appearances of the phrases "in one implementation", "in one embodiment", or "in an embodiment", or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the singular forms "a", "an", and "the" include plural referents unless the content clearly dictates otherwise. Thus, for example, reference to a distributed system including "a processor-based device" includes a single a processor-based device, or two or more a processor-based devices. It should also be noted that the term "or" is generally employed in its sense including "and/or" unless the content clearly dictates otherwise.

The headings provided herein are for convenience only and do not interpret the scope or meaning of the embodiments.

Figure 1:
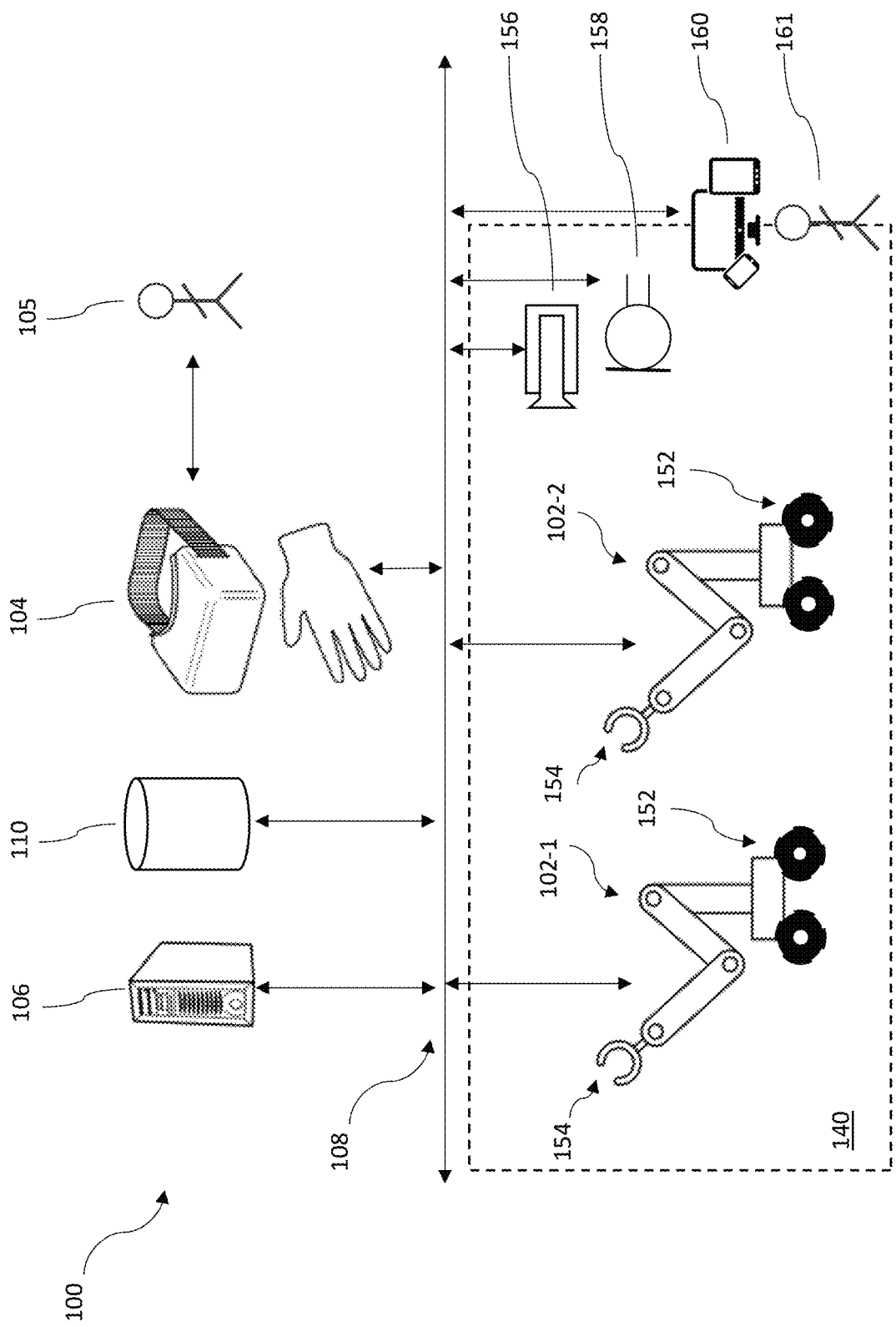
FIG. 1 is a schematic diagram illustrating a portion of a system including distributed hosts that may be used to implement the present systems, devices, articles, and methods.

FIG. 1 shows an exemplary distributed system 100 in accordance with the present system, devices, articles, and method. Various components of system 100 are optional. As shown, the system 100 includes a plurality of hosts 102-1, 102-2, 106-1, 106-2 with two or more of the hosts in communication with each other. A host in the plurality of hosts includes at least one hardware processor, that may execute processor readable and processor-executable instructions. The plurality of hosts include a plurality of robots 102-1, 102-2, (two shown, singularly or collectively 102). The robots 102 may be associated with one or more optional operator interfaces, such as, operator interface 104. The plurality of hosts include a plurality of computer systems, e.g., computer systems 106-1, 106-2 (two shown, collectively 106). While illustrated as two robots 102-1, 102-2, and two computer systems 106-1, 106-2 various implementations can include a greater or fewer number of robots 102, and/or computer systems 106.

The plurality of hosts may all be communicatively coupled via one or more network or non-network communication channel(s) 108. The system 100 can include one or more nontransitory tangible computer- and processor-readable storage devices 110 which store processor-executable instructions and/or processor-readable data. A nontransitory storage device includes one or more storage media upon, or within, which processor-executable instructions and/or processor-readable data may be stored. While illustrated separately from the computer systems 106, in at least some implementations the one or more nontransitory tangible computer- and processor-readable storage devices 110 can be an integral part or component of the computer systems 106 (e.g., memory such as RAM, ROM, FLASH, registers; hard disk drives, solid state drives).

Operator interface 104 includes one or more input devices to capture motion or actions of a human operator 105. Operator interface 104, an example of a user interface, can include one or more user input devices, including those described herein, and one or more user output devices, for instance a display (e.g., LCD or OLED screen), head mounted display, speaker, and/or haptic feedback generator (e.g., vibration element, piezo-electric actuator, rumble motor). Human operator via operator interface 104 can perform a series of actions to guide a robot, e.g., robot 102-2, to accomplish at least one task.

Examples of computer systems 106 are described herein. Computer systems 106 may facilitate or coordinate the operation of system 100. A computer system in computer systems 106 could be a processor-based computer system. The processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. Computer systems 106 may include a control subsystem including at least one processor. The at least one processor or the control subsystem or computer system 106 may be referred to as a controller. The computer systems 106 or system may, in some instances, be termed or referred to interchangeably as a computer, server or an analyzer.

Examples of a suitable network or communication channel, such as communication channel(s) 108, include wire based network or non-network communication channel(s), optical based network or non-network communication channel(s), wireless (e.g., radio and/or microwave frequency) network or non-network communication channel(s), or a combination of wired, optical, and/or wireless networks or non-network communication channels. Suitable communication protocols include FTP, HTTP, Web Services, SOAP with XML, and the like.

System 100 can include one or more robots 102, and the like. Human operator 105 may via an interface, such as operator interface 104, pilot or direct at least one of the one or more of robots 102, in piloted mode. Robots 102 may operate in autonomous mode. Robots 102 operate in, and receive data about, an environment 140 that comprises a physical space. "About" is employed herein in the sense that means represent, characterize, or summarize.

A robot, like one of robots 102, is an electro-mechanical machine controlled by circuitry and/or one or more hardware processors executing processor-executable instructions. One or more robots 102 can be controlled autonomously, for example via an on-board or a remote processor executing processor-executable instructions, typically based on some sensed input data (e.g., processed machine-vision information, information that represents a level of force or weight sensed by a transducer, information representative of a distance traveled, for instance optical encoder information information). One or more human operators can control one or more robots 102. Another machine, including another robot, or the like, can control the one or more robots 102. In some instances, a robot 102 may be controlled autonomously at one time, while being piloted, operated, or controlled by a human operator at another time. That is, operate under an autonomous control mode and change to operate under a piloted mode (i.e., non-autonomous).

A robot performs one or more physical tasks, for example, performing work with tangible results and/or performs computational tasks. A robot has the ability to move at least a portion of the robot in a physical space, such as environment 140, to accomplish physical tasks. As well, a robot includes computational resources, on-board and/or remote computational resources, to perform computational tasks. The computational tasks can be in aid of the physical tasks, e.g., creating a plan, as a task, to accomplish a tangible result to physical task. A robot has the ability to acquire information from sensors, on-board and/or remote sensors. A robot can be included as a component in a larger system, for instance system 100.

A robot 102 typically includes a propulsion or motion subsystem (e.g., wheels 152 and a drivetrain) comprising of one or more motors, solenoids or other actuators, and associated hardware (e.g., drivetrain, wheel(s), treads), to propel the robot in a physical space. The space does not need to be horizontal or terrestrial. Examples of spaces include water, air, vertical spaces, outer space (i.e., outside the Earth's atmosphere), and the like.

A robot includes a manipulation subsystem 154 comprising one or more appendages, such as, one or more arms and/or one or more associated end-effectors also referred to as end of arm tools. An end-effector or end of arm tool is a device attached to a robotic arm or appendage designed or structured to interact with the environment. End-effectors for robot operating in unstructured environments are devices of complex design. Ideally, these are capable of performing many tasks, including for example grasping or gripping or otherwise physically releasably engaging or interacting with an item.

Robots 102 operate in, and receive data about, an environment 140 that comprises a physical space. Robots 102 receive data from one or more sensors such as environmental sensors or internal sensors. Environmental sensors provide data that represents one or more aspect of the environmental conditions for the robots 102. Examples of environmental sensors includes camera 156 and microphone 158. The internal sensor data represents information about the internal state of a robot. "About" in this context is employed in the sense that means represent, characterize, or summarize. For example, the internal sensor data represents a level of an internal power supply (e.g., battery, energy source, fuel cell, fuel, or the like).

Examples of robots 102 and parts thereof, including storage devices, are shown and described in relation to, at least, FIGS. 2, 4, and 15-17.

A human operator 105, not part of the distributed system 100, may pilot at least one of the one or more of robots 102, for example via operator interface 104. Alternatively, a robot may act autonomously (i.e., under its own control). In a human operator controlled (or piloted) mode, the human operator 105 observes representations of sensor data, for example, video, audio, or haptic data received from one or more environmental sensors or internal sensor. The human operator then acts, conditioned by a perception of the representation of the data, and creates information or executable instructions to direct the at least one of the one or more of robots 102.

A robot, like one of robots 102, may operate in communication with communication channel(s) 108. Robots 102 may send and/or receive processor readable data or processor-executable instructions via communication channel(s) 108. Robots 102 interact with one or more user interfaces.

Operator interface 104 receives and/or sends processor-readable data and/or processor-executable instructions across communication channel(s) 108. Operator interface 104 creates or provides human readable representations of processor readable instructions.

The system 100 can include one or more user interface devices 160. The one or more user interface devices 160 includes one or more input and output devices such as keyboards, mice, touch displays, displays (e.g., LCD or OLED screen), and the like. The one or more user interface devices 160 may be devices in different form factors, such as, personal computer, tablet, (smart) phone, wearable computer, and the like. A person, such as a human operator or observer, could operate or utilize user interface device(s) 160 to input information that represents success or failure of a robot at the one or more tasks, and the like.

One or more human observers 161 may observe aspects of environment 140, robots 102, and the like. Observer(s) 161 may view or see a representation of the robot performing one or more tasks. For example, observer(s) 161 may review one or more still images and one or more moving images of the robots 102 in environment 140. Observer(s) 161 may be present in or proximate to environment 140 to directly experience, e.g., view, robots 102 performing one or more tasks. Observer(s) 161 may interact with user interface device(s) 160 to provide information about the robots and the one or more tasks.

While system 100 is illustrated with two robots 102, one operator interface 104, one processor-based computer system 106, and one user interface device(s) 160, any of the various implementations can include a greater or lesser number of robots 102, operator interface(s) 104, processor-based computer systems 106, and user interface device(s) 160. Human operator 105 at operator interface 104 may interact with parts of system 100 to navigate a virtual environment (not shown).

Figure 2:
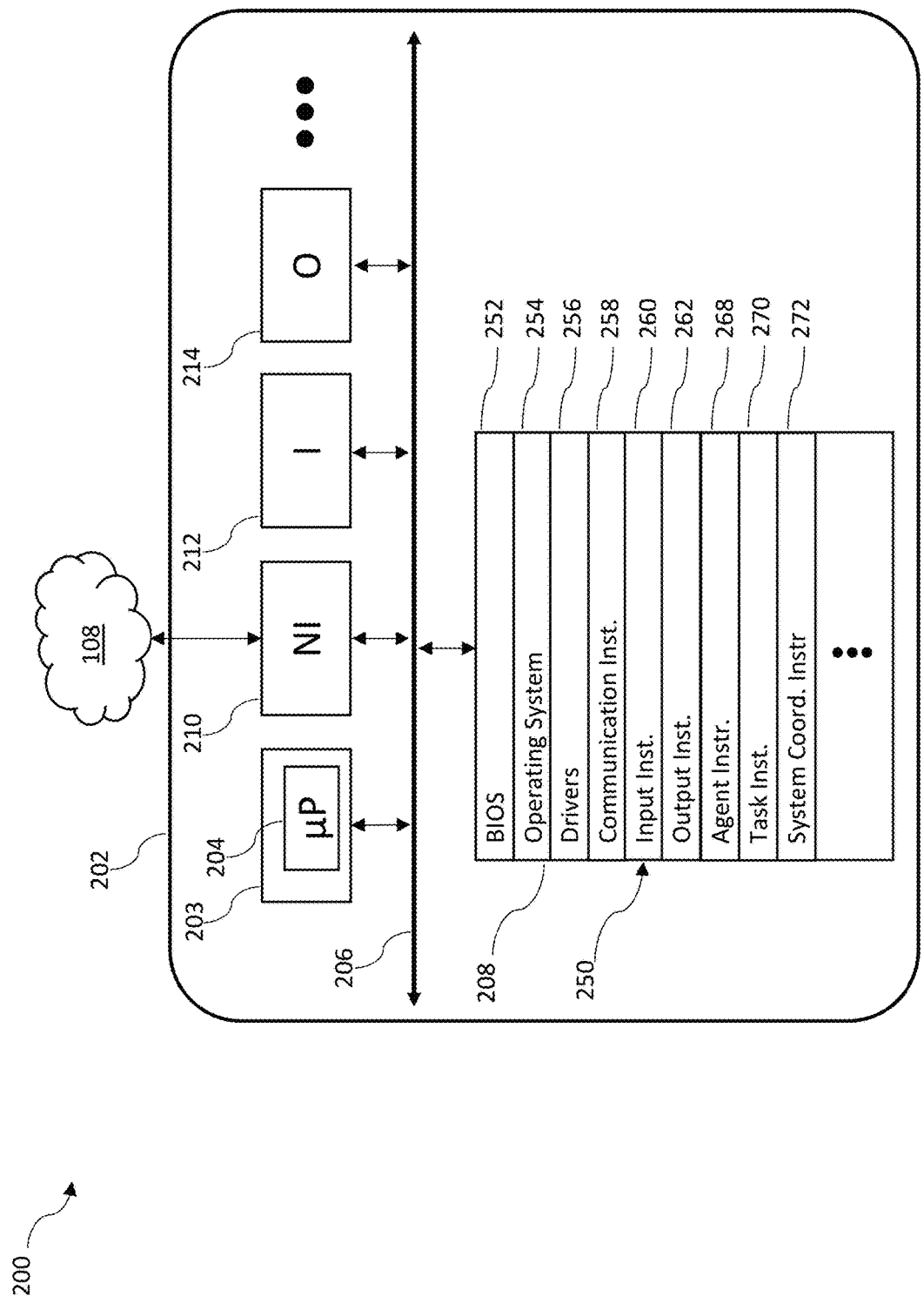
FIG. 2 is a schematic view illustrating an exemplary computer system suitable for inclusion in the system of FIG. 1.

FIG. 2 schematically shows parts of a computer system, including a processor, for use as a host in the system 100, shown in FIG. 1 in accordance with the present system, devices, articles, and methods. Computer system or system 200 shares some similar components with a robot, such as, robot 102, but differs in lacking the propulsion or motion sub-system and the manipulation sub-system.

The system 200 includes at least one body or housing 202, and a control subsystem 203 that includes at least one processor 204, at least one nontransitory computer- or processor-readable storage device 208, and at least one bus 206 to which, or by which, the at least one processor 204, and storage device(s) 208 are communicatively coupled.

At least one processor 204 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. Processor(s) 204 may be referred to in the singular, but may be two or more processors.

The system 200 includes a network interface subsystem 210 in communication with the bus(es) 206 and provides bi-directional communicative coupling to other systems (e.g., a system external to computer system 200) via one or more network or non-network communication channel(s) (e.g., communication channel(s) 108. Network interface subsystem 210 includes circuitry. Network interface subsystem 210 may use a communication protocols (e.g., FTP, HTTP, Web Services, and SOAP with XML) to effect bidirectional communication of information including processor-readable data, and processor-executable instructions.

The system 200 includes an input subsystem 212. In some implementations, input subsystem 212 includes one or more user interface input devices, such as, a display a keyboard, a mouse, a microphone, and a camera. In some implementations, input subsystem 212 includes one or more sensors such as environmental sensors. In some implementations, input subsystem 212 is coupled to the control subsystem 203 via the network interface subsystem 210. The system 200 includes an output subsystem 214 comprising one or more output devices, such as, displays, speakers, and lights. Bus(es) 206 bring input subsystem 212, output subsystem 214, and processor(s) 204 in communication with each other.

The at least one nontransitory computer- or processor-readable storage device 208 includes at least one nontransitory storage medium. In some implementations, storage device 208 includes two or more distinct devices. Storage device(s) 208 can, for example, include one or more a volatile storage devices, for instance random access memory (RAM), and one or more non-volatile storage devices, for instance read only memory (ROM), Flash memory, magnetic hard disk (HDD), optical disk, solid state disk (SSD), and the like. A person of skill in the art will appreciate storage may be implemented in a variety of ways such as a read only memory (ROM), random access memory (RAM), a hard disk drive (HDD), a network drive, flash memory, digital versatile disk (DVD), any other forms of computer-readable memory or storage medium, and/or a combination thereof. Storage can be read only or read-write as needed. Further, modern computer systems and techniques conflate volatile storage and non-volatile storage, for example, caching, using solid-state devices as hard drives, in-memory data processing, and the like. The at least one storage device 208 may store on or within the included storage media processor-readable data, and/or processor-executable instructions.

Storage device(s) 208 include or stores processor-executable instructions and/or processor-readable data 250 associated with the operation of computer system 200, system 100, robot(s) 102, computer system(s) 106, and the like. In some implementations, the processor-executable instructions and/ or processor-readable data 250 includes include a basic input/output system (BIOS) 252, an operating system 254, drivers 256, communication instructions and data 258, input instructions and data 260, output instructions and data 262, agent instructions and data 268, task instructions and data 270, and system coordination instructions and data 272.

Exemplary operating systems 254 include ANDROID™, LINUX®, and WINDOWS®. The drivers 256 include processor-executable instructions and data that allow control subsystem 203 to control circuitry of computer system 200. The processor-executable communication instructions and data 258 include processor-executable instructions and data to implement communications between computer system 200 and another processor-based device via network interface subsystem 210. The processor-executable input instructions or data 260, when executed, guide computer system 200 to process input from input subsystem 212, from sensors included in a wider system such as system 100, information that represents input stored on or in a storage device. The processor-executable output instructions or data 262, when executed, guide or direct computer system 200 to provide and/or transform information for display. The processor-executable agent instructions and data 268 when executed, guide or direct computer system 200 to perform tasks associated with agents, such as, locate an agent, start agent, stop agent, run processor-executable instructions associated with agent, have one or more agents fill one or more roles, send data to or from agent, and receive data at agent. The processor-executable task instructions and data 270, when executed, guide or direct computer system 200 in an instant application or task for computer system 200, computer system 106, system 100, robot 102, or the like.

The processor-executable system coordination instructions and data 272 guide the computer system 200 to start, run, and stop one or more agents. The instructions and data 272 guide the system in establishing and maintaining communication between agents. The instructions and data 272 when executed may direct the system to record data generated in the operation of a system of distributed agents. The processor-executable agent instructions and data 268, processor-executable task instructions and data 270, and/or processor-executable system coordination instructions and data 272 may implement, in part, the methods described herein, including those in and in relation to FIGS. 6, 7, 8, and so on.

Figure 3:
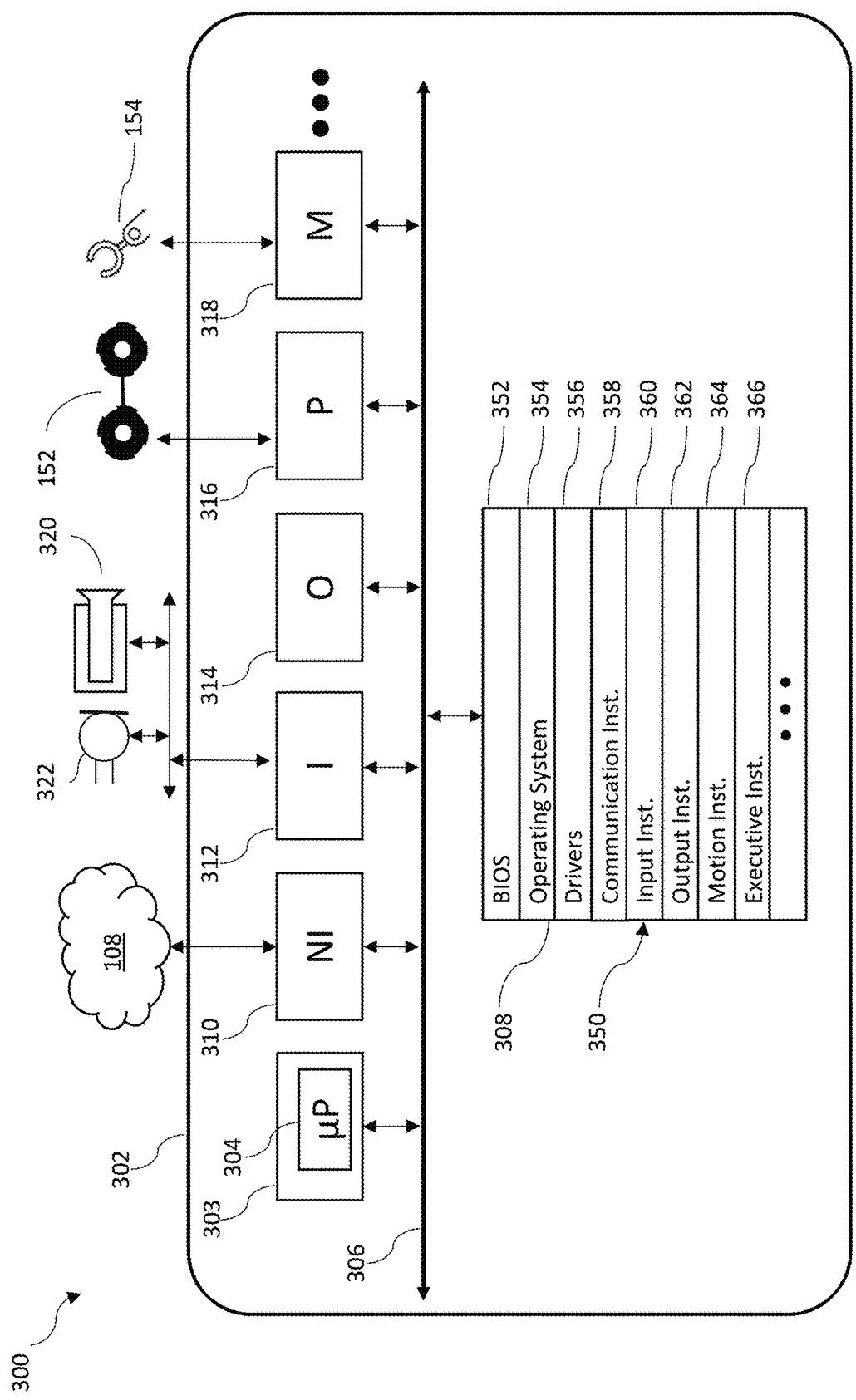
FIG. 3 is a schematic view illustrating an exemplary robot suitable for inclusion in the system of FIG. 1.

FIG. 3 illustrates an exemplary robot 300. As discussed herein, robots may take any of a wide variety of forms. FIG. 3 schematically shows parts of robot 300. Robot 300 includes at least one body 302, a control subsystem 303 that includes at least one processor 304, at least one nontransitory tangible computer- and processor-readable storage device 308, and at least one bus 306 to which the at least one processor 304 and the at least one nontransitory tangible computer- or processor-readable storage device 308 are communicatively coupled.

The at least one processor 304 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. At least one processor 304 may be referred to herein by the singular, but may be two or more processors.

Robot 300 may include a communications subsystem 310 in communication with the bus(es) 306 and provides bi-directional communication with other systems (e.g., external systems external to the robot 300) via a network or non-network communication channel(s), such as, communication channel(s) 108. An example network is a wireless network. The communications subsystem 310 may include one or more buffers. The communications subsystem 310 receives and sends data for the robot 300.

The communications subsystem 310 may be any circuitry effecting bidirectional communication of processor-readable data, and processor-executable instructions, for instance radios (e.g., radio or microwave frequency transmitters, receivers, transceivers), communications ports and/or associated controllers. Suitable communication protocols include FTP, HTTP, Web Services, SOAP with XML, WI-FI compliant, BLUETOOTH compliant, cellular (e.g., GSM, CDMA), and the like.

Robot 300 includes an input subsystem 312. In any of the implementations, the input subsystem 312 can include one or more sensors that measure conditions or states of robot 300, and/or conditions in the environment in which the robot 300 operates. Such sensors include cameras or other imagers 320 (e.g., responsive in visible and/or nonvisible ranges of the electromagnetic spectrum including for instance infrared and ultraviolet), radars, sonars, touch sensors, pressure sensors, load cells, microphones 322, meteorological sensors, chemical sensors, or the like. Such sensors include internal sensors, pressure sensors, load cells, strain gauges, vibration sensors, microphones, ammeter, voltmeter, or the like. In some implementations, the input subsystem 312 includes receivers to receive position and/or orientation information. For example, a global position system (GPS) receiver to receive GPS data, two more time signals for the control subsystem 303 to create a position measurement based on data in the signals, such as, time of flight, signal strength, or other data to effect a position measurement. Also for example, one or more accelerometers can provide inertial or directional data in one, two, or three axes.

Robot 300 includes an output subsystem 314 comprising output devices, such as, speakers, lights, and displays. The input subsystem 312 and output subsystem 314, are in communication with to the processor(s) 304 via the bus(es) 306.

Robot 300 includes a propulsion or motion subsystem 316 comprising motors, actuators, drivetrain, wheels, tracks, treads, and the like to propel or move the robot 300 within a physical space and interact with it. The propulsion or motion subsystem 316 comprises of one or more motors, solenoids or other actuators, and associated hardware (e.g., drivetrain, wheel(s), treads), to propel robot 300 in a physical space. For example, the propulsion or motion subsystem 316 includes wheels 152 and a drive train. Propulsion or motion subsystem 316 may move body 302 in an environment.

Robot 300 includes a manipulation subsystem 318, for example comprising one or more arms, end-effectors, associated motors, solenoids, other actuators, gears, linkages, drive-belts, and the like coupled and operable to cause the arm(s) and/or end-effector(s) to move within a range of motions. For example, the manipulation subsystem 318 includes an end-effector described in relation to manipulation subsystem 154. The manipulation subsystem 318 is in communication with the processor(s) 304 via the bus(es) 306, which communications can be bi-directional or uni-directional.

Components in robot 300 may be varied, combined, split, omitted, or the like. For example, robot 300 could include a pair of cameras (e.g., stereo pair) or a plurality of microphones. Robot 300 may include one, two, or three end-effectors or end of arm tools in manipulation subsystem 318. In some implementations, the bus(es) 306 include a plurality of different types of buses (e.g., data buses, instruction buses, power buses) included in at least one body 302. For example, robot 300 may include a modular computing architecture where computational resources devices are distributed over the components of robot 300. That is in some implementations, a robot (e.g., robot 300), could have a processor in a left arm and a storage device in its thorax. In some implementations, computational resources are located in the interstitial spaces between structural or mechanical components of the robot 300. A data storage device could be in a leg and a separate data storage device in another limb or appendage. In some implementations, the computational resources distributed over robot 300 include redundant computational resources.

The at least one storage device 308 is at least one nontransitory or tangible storage device. The at least one storage device 308 can include two or more distinct non-transitory storage devices. The storage device(s) 308 can, for example, include one or more a volatile storage devices, for instance random access memory (RAM), and/or one or more non-volatile storage devices, for instance read only memory (ROM), Flash memory, magnetic hard disk (HDD), optical disk, solid state disk (SSD), and the like. A person of skill in the art will appreciate storage may be implemented in a variety of nontransitory structures, for instance a read only memory (ROM), random access memory (RAM), a hard disk drive (HDD), a network drive, flash memory, digital versatile disk (DVD), any other forms of computer- and processor-readable memory or storage medium, and/or a combination thereof. Storage can be read only or read-write as needed. Further, systems like system 100 can conflate volatile storage and non-volatile storage, for example, caching, using solid-state devices as hard drives, in-memory data processing, and the like.

The at least one storage device 308 includes or stores processor-executable instructions and/or processor-readable data 350 associated with the operation of robot 300, system 100, and the like.

The execution of processor-executable instructions and/or processor-readable data 350 cause the at least one processor 304 to carry out various methods and actions, for example via the motion subsystem 316 or the manipulation subsystem 318. The processor(s) 304 and/or control subsystem 303 can cause robot 300 to carry out various methods and actions including receiving, transforming, and presenting information; moving in environment 140; manipulating item(s); and acquiring data from sensors. Processor-executable instructions and/or processor-readable data 350 can, for example, include a basic input/output system (BIOS) 352, an operating system 354, drivers 356, communication instructions and data 358, input instructions and data 360, output instructions and data 362, motion instructions and data 364, and executive instructions and data 366.

Exemplary operating systems 354 include ANDROID™, LINUX®, and WINDOWS®. The drivers 356 include processor-executable instructions and data that allow control subsystem 303 to control circuitry of robot 300. The processor-executable communication instructions and data 358 include processor-executable instructions and data to implement communications between robot 300 and an operator interface, terminal, a computer, or the like. The processor-executable input instructions or data 360 guide robot 300 to process input from sensors in input subsystem 312. The processor-executable input instructions and data 360 implement, in part, the methods described herein. The processor-executable output instructions or data 362 guide robot 300 to provide information that represents, or produce control signal that transforms, information for display. The processor-executable motion instructions and data 364, when executed, cause the robot 300 to move in a physical space and/or manipulate one or more items. The processor-executable motion instructions and data 364, when executed, may guide the robot 300 in moving within its environment via components in propulsion or motion subsystem 316 and/or manipulation subsystem 318. The processor-executable executive instructions and data 366, when executed, guide the robot 300 the instant application or task for processor-based computer system 106, system 100, or the like. The processor-executable executive instructions and data 366, when executed, guide the robot 300 in reasoning, problem solving, planning tasks, performing tasks, and the like.

Figure 4:
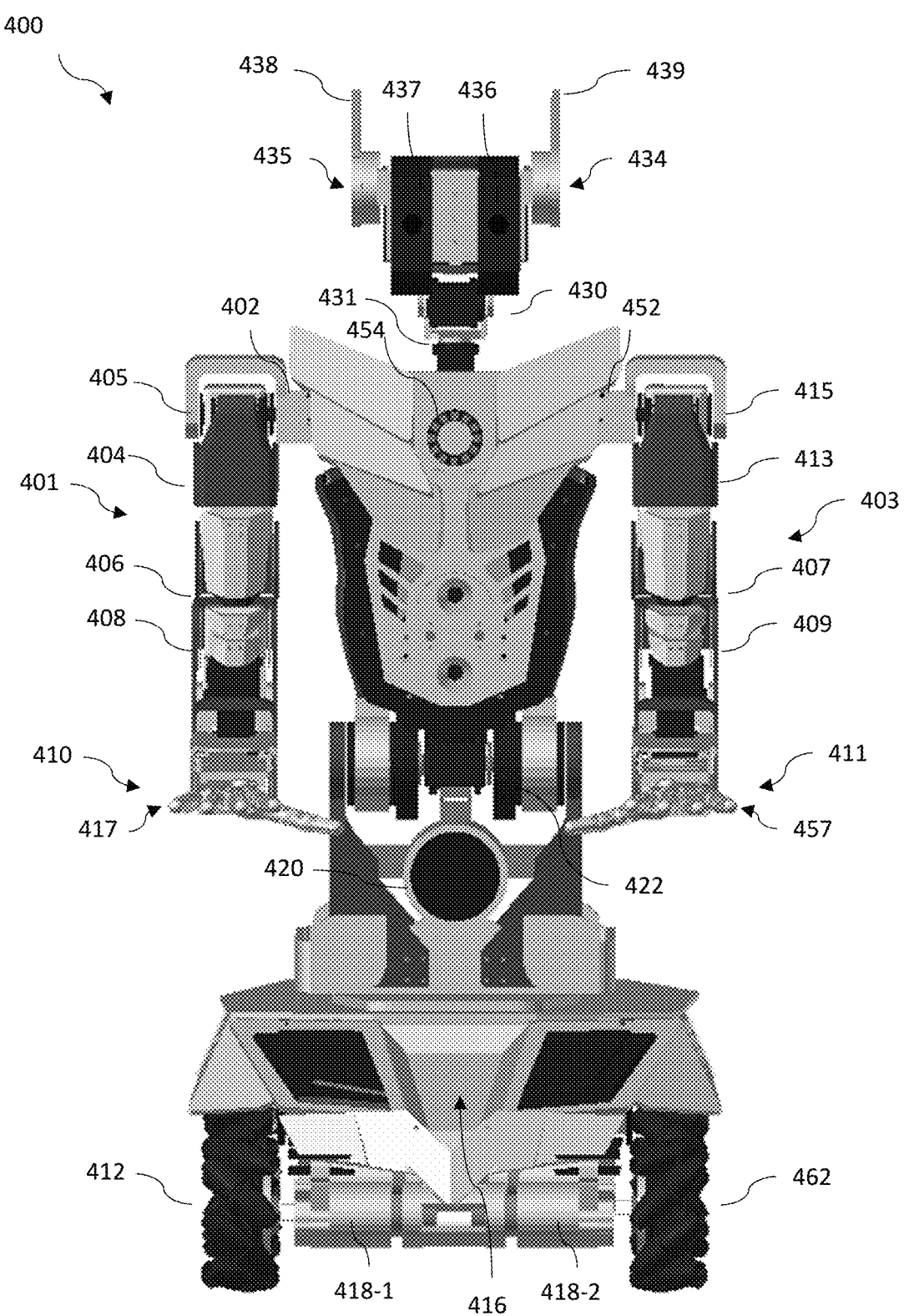
FIG. 4 is an elevation view illustrating a robot in accordance with the present systems, devices, articles, and methods.

FIG. 4 illustrates an exemplary robot 400. As discussed herein, robots may take any of a wide variety of forms. These include human operator controllable robots, autonomous robots, and hybrid robotic robot (i.e., partially autonomous, partially piloted). A robot comprises one or more bodies, also called structural components, or brackets. The bodies are coupled by joints, for example, bearings, and/or servo-motors. For example, a first body is connected to a second body by a servo or the like. It is possible to describe a robot in terms of the joints or the bodies. FIG. 4 is described in terms of the joints but a person of skill in the art will appreciate a body based description is possible.

In various implementations, shoulder servos 402 and 405 may control and sense roll and pitch respectively of a shoulder of a first arm 401 of the robot 400. In some implementations, the shoulder servos 402 and 405 may, for example be DYNAMIXEL™ MX-28, MX-64, or AX-12 servo-motors produced by ROBOTIS CO. LTD. of Seoul, South Korea.

In some implementations, the shoulder yaw servo 404 may control and sense the yaw of the first arm 401 of the robot 400. Yaw is a motion analogous to medial rotation (i.e., inward rotation toward the body) and lateral rotation (i.e., outward rotation away from the body). In various implementations, the shoulder yaw servo 404 may be a servo-motor like shoulder servos 402 and 405.

In some implementations, the elbow servo 406 controls and senses an elbow of the first arm 401 of robot 400. The elbow servo 406 may be a servo-motor like shoulder servos 402 and 405.

In some implementations, the wrist servo 408 may control and sense an end-effector rotation of the robot 400. In some implementations, the wrist servo 408 maybe a servo-motor as described herein and including servos for shoulder servos 402 and 405.

Each of shoulder servos 402 and 405, and servo in robot 400, work cooperatively with a respective joint, or joint and gearbox. In various implementations roll is adduction (i.e., appendage moves toward torso) and abduction (i.e., appendage moves away from torso) of first arm 401. In various implementations pitch is flexion (i.e., appendage reduces angle between itself torso of more proximal appendage) and extension (i.e., appendage increases angle) (e.g., backward) of first arm 401.

In various implementations, the end-effector 410 may include a plurality of digits 417. For example, four fingers and a thumb are shown in FIG. 4. A thumb is generally regarded as a digit that may be used to oppose two more digits. In the case of an opposed pair of digits the thumb may be the short or less mobile digit. In some implementations, the digits of the end-effector 410 may include embedded force sensitive resistors. Respective servos, which may, for example be DYNAMIXEL™ XL-320 servo-motors or TOWERPRO™ hobby servos, may operate each digit independently. The end-effectors may, in some implementations, facilitate dexterous manipulation of items.

In some implementations, one or more digits of digits 417 of the end-effector 410 may have polymer filled internal and external structure and/or rubber pads proximate to the extremities of the one or more digits of digits 417. The material may, in operation enhance grip capacity of an end-effector and simulate the resistance of a human finger.

In some implementations, digits, such as digits 417, may each have one or more contact sensors and/or pressure sensors to sense pressure applied to the sensor and produce signals proportional to the pressure.

The second arm 403 is generally similar to the first arm 401 but mirrored. Referring to FIG. 4, the second arm 403 includes a shoulder roll servo 452, a shoulder pitch servo 415, a shoulder yaw servo 413, an elbow servo 407, a wrist servo 409, and end-effector 411 including a plurality of digits 457.

In at least one implementation, the robot 400 includes one or more components comprising wheels, such as wheel(s) 412 and wheel(s) 462, an electronics compartment 416, motors 418-1 and 418-2 (e.g., DC-motors, only two shown, singularly or collectively 418), a speaker 420, a waist pitch servo(s) 422, an interlock (to share torso support with waist pitch servo(s) 422), a single board computer (SBC) (not shown), two neck servos (including a head pitch servo 430 and a head yaw servo 431), ear servos 434 and 435, cameras 436 and 437, microphones 438 and 439, lights/LEDs 454, and cable bundles (not shown).

In some implementations, wheel(s) 412 and wheel(s) 462 provide the capacity for locomotion to the robot 400. Wheel(s) 412 and wheel(s) 462 may provide a broad base which, in some examples, increases stability of the robot 400. In other implementations, one or more treads or tracks can provide locomotion.

In various implementations for example, one or more on-board power sources may be found in the electronics compartment 416. The on-board power sources can, for example include one or more batteries, ultra-capacitors, fuel cells, to independently power different components of the robot 400. One or more servos can be powered by a different battery or batteries to other servos or other systems.

Exemplary batteries include secondary cells, for instance lithium polymer cells, for example, a 16V, 10000 mAh, four cell, LiPo battery; a 4000 mAh 3 cell 12 V battery; a 5 V 9600 mAh, USB mobile charging power pack; and a batter pack including one or more 3.7 V lithium ion batteries. A lower voltage source can be down regulated from a higher voltage source. In some implementations, robot 400 is coupled to a power source via a power cable. Robot 400 may be powered by an inductive power coupling.

Figure 5:
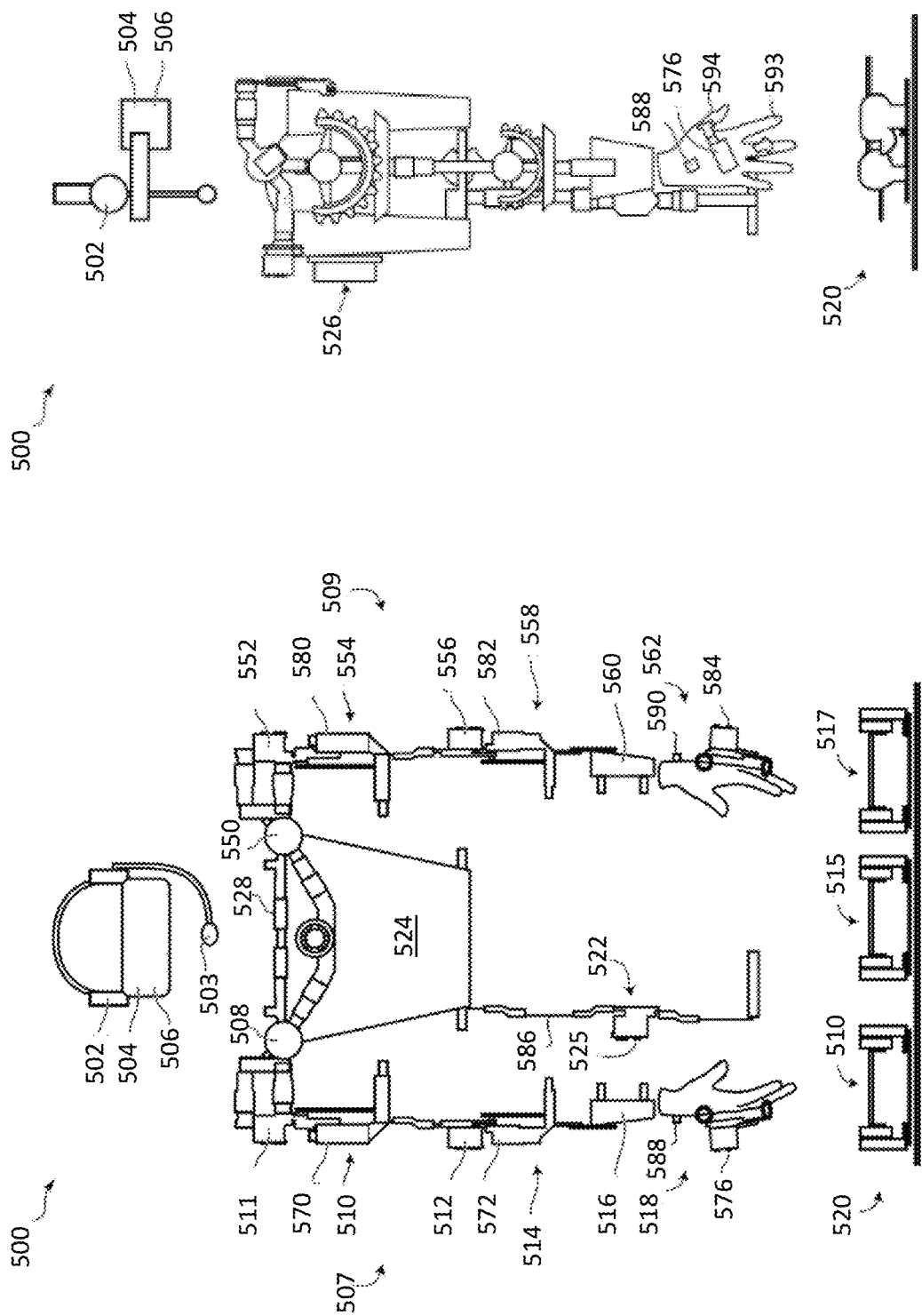
FIGS. 5A and 5B are elevation views illustrating an exemplary operator interface suitable for inclusion in the system shown in FIG. 1.

FIGS. 5A and 5B illustrate aspects and parts of operator interface 500 which is an example of operator interface 104. FIG. 5A is a front elevation view of the operator interface 500. FIG. 5B is a side elevation view of the operator interface 500 shown in FIG. 5A. The operator interface 500 is designed to be partially worn and partially stood on, and physically engageable by a human operator, such as, human operator 105. The operator interface 500 may include an operator interface processor, computer and processor readable storage device, display, potentiometers, speakers, a microphone, an inertial measurement unit ("IMU"), a haptic glove or manipulator interface, and an input/output ("I/O") interface, all of which are in communication with the operator interface processor. As discussed above, in various implementations an operator interface generally similar to the operator interface shown in FIGS. 5A and 5B may include fewer, additional, or alternative sensors, actuators, and/or output devices to those of the operator interface 500 shown in FIGS. 5A and 5B.

The operator interface 500 includes left/right audio output 502, a microphone 503, left and right visual display 504, a head/neck motion sensor 506, and first and second arm sensor assemblies 507 and 509.

The first arm sensor assembly 507 includes a shoulder roll servo 508, a shoulder pitch servo 511, an upper-arm rotation capture device 510, an elbow servo 512, a lower-arm rotation capture device 514, a forearm mount or strap 516, and a manipulator interface or haptic glove 518. The second arm sensor assembly 509 may be generally similar to the first arm sensor assembly 507 but mirrored. The second arm sensor assembly 509 includes a shoulder roll servo 550, a shoulder pitch servo 552, an upper-arm rotation capture device 554, an elbow servo 556, a lower-arm rotation capture device 558, a forearm mount 560, and a manipulator interface or haptic glove 562.

Operator interface 500 includes a set of two or more locomotion pedals 520, such as, first, second, and third locomotion pedals 513, 515, and 517. The operator interface also includes a torso pitch interface 522 including an extension arm and a waist servo 525, a vest 524, an electronic back-box 526 and a chest/shoulder support structure 528.

In some implementations, the left/right audio output 502 (only one called out in Figures) may be implemented using speakers or headphones to provide an interface for receiving audio information from an operator controllable robot, such as, one of robots 102, or robot 400, to an operator using operator interface 500. In some implementations, the microphone 503 provides an interface for sending audio to a human operator controllable robot or may be used to voice to command interface.

The left and right visual displays 504 may provide an interface for displaying visual information captured by cameras for the operator controllable robot, e.g., cameras 436 and 437. In some implementations, other visual information may also or alternatively be generated for display on the left and right displays 504. An example of generated information which may be displayed on the left and right visual display 504 is battery charge levels of the operator controllable robot. In some implementations, the generated information includes a metric for a robot as determined by one or more observers. In one implementation, a virtual reality headset, such as, an OCULUS RIFT™ virtual reality headset, implements the left and right visual display 504.

The head/neck motion sensor 506 senses or captures movement of an operator's head, specifically pitch and yaw. In one implementation, the head/neck motion sensor 506 may include a gyroscope, an accelerometer, a magnetometer, and/or another inertial measurement unit (IMU). In various implementations, the head/neck motion sensor 506 is part of, e.g., built into, a virtual reality headset.

In various implementations, the shoulder roll servo 508 and the shoulder pitch servo 511 may sense or capture positions of an operator's shoulder under different roll and pitch. In some implementations, the servos may include feedback resistors or potentiometers that provide signals representing servo position measurements. In some implementations, the shoulder servos 508 and 511 sense or receive information about and then simulate or replicate positions of corresponding shoulder servos in a robot, e.g., servos 402 and 405 respectively. In some implementations, these servos 508 and 511 are DYNAMIXEL™ AX-12 servos.

Referring still to FIG. 5A, in various implementations, the upper-arm rotation capture device 510 may sense or capture rotation of an upper arm of an operator. In some implementations, the upper-arm rotation capture device 510 includes a first semi-circular gear or gear mechanism that curls or wraps around the upper arm and couples with a second semi-circular gear or gear mechanism at about 90 degrees to the first. In some implementations, the first and second semi-circular gears or gear mechanisms cooperatively transfer the rotation of the upper arm to the rotation of a potentiometer 570 to the second gear or gear mechanism. The potentiometer 570 may be centered on or around the second gear or gear mechanism.

In some implementations, a non-moving part of the potentiometer physically couples to the operator's shoulder. In at least one implementation, the potentiometer has a wider than normal central shaft with a hole in the center. In some implementations, the potentiometer is, for example, a 39/20 mm Center Space Rotary Potentiometer.

In some implementations, the elbow servo 512 may capture or sense an angle of an operator's elbow. For example, in at least one implementation, the elbow servo 512 is a DYNAMIXEL™ AX-12. In some implementations, the elbow servo 512 simulates or replicates positions of the elbow servo of an operator controllable robot, e.g., servo 406.

In some implementations, the lower-arm rotation capture device 514 may capture or sense the rotation of the lower arm of the operator. In some implementations, lower-arm rotation capture device 514 may operate generally similarly to the upper-arm rotation capture device 510. The lower-arm rotation capture device 514 includes a semi-circular gear or gear mechanism that wraps around the lower arm and couples with a second semi-circular gear or gear mechanism at 90 degrees to the first. This gear arrangement may transfer the rotation of the lower arm to the rotation of a potentiometer 572 centered around and connected to the second gear or gear mechanism. In various implementations, a non-moving part of a potentiometer may be fixed to the operator's arm. The potentiometer 572 may, for example, be a 39/20 mm center space rotary potentiometer from PANASONIC CORP. of Osaka, Japan.

In various embodiments, forearm strap 516 may secure the first arm sensor assembly 507 of the operator interface 500 to the operator. In some implementations, the haptic glove 518 may capture or sense a position of the operator's pointer finger and thumb relative to one another. A servo 576 may be attached to the haptic glove 518 at the center point of rotation of the thumb and pointer finger of the operator. The angle of the servo may be controlled by two armatures 593 and 594 with rings allowing coupling of the operator fingers to the armatures. A first armature is attached to the operator glove thumb 593 and a second armature is affixed to the operator glove pointer finger 594. In some implementations, the servo provide feedback information garnered from an end-effector of the operator controllable robot (e.g., robot 102) to the fingers of the operator using the operator interface 500 in the form of resistance as the operator guides the operator controllable robot to pick up an item. In some implementations, the haptic glove 518 may use a DYNAMIXEL™ AX-12 servo.

The haptic glove 518 may have a vibrational device (e.g., vibrator) or buzzer 588, to vibrate with an amplitude or frequency that is a function of the signals coming from the finger pressure sensors of the haptic glove 518 of an operator controlled device, such as, robot 400 (FIG. 4). In some implementations, the amplitude or frequency may increase with increasing sensed pressure. The vibrational device 588 may be mounted on the back of the operator interface glove, or elsewhere on the haptic glove.

As discussed above, the second arm sensor assembly 509 mirrors and may be generally similar to the first arm sensor assembly 507. In some embodiments, the upper-arm rotation capture device 554 includes a potentiometer 580, the lower-arm rotation capture device 558 includes a potentiometer 582, and the haptic glove 562 includes a servo 584 and a left vibrational device 590.

In some implementations, an operator controls the locomotion pedals 520. An operator generally will selectively use one or both feet to move the pedals. The locomotion pedals 520 are arranged and tuned such that angles sensed or captured by the pedals control the motors 418 of the robot 400 and thus control locomotion of the robot 400. In some implementations, left and right forward motion pedals 517 and 510 may operate independently to trigger left and right wheel pairs 462 and 412 respectively of the motility subsystem of the robot 400 and facilitate turning of the robot 400.

In some implementations, the locomotion pedals 520 may include a reverse motion pedal 515 that in response to actuation controls both left and right wheel pairs 462 and 412 shown in FIG. 4. The three pedals may be fixed to a single rubber mat to prevent movement (e.g., slide) during use. In some implementations, each of the locomotion pedals 520 includes a rotating, pivoting, or swinging foot platform, a potentiometer to capture the angle of the foot platform, and a spring to return the pedal to a neutral position when the operator's foot is removed. The spring from a domestic mousetrap provides sufficient restorative force for the purpose.

In some implementations, the locomotion pedals 520 may include a pedal for the left drive train, a pedal for the right drive train, and a pedal for reverse. In some implementations, the left and right drive train pedals may provide signals which are combined to calculate a rotational and linear velocity of the operator controllable robot (e.g., robot 400).

In some implementations, a torso pitch interface 522 captures or senses how much an operator has bent forward by the angle of the operator's torso relative to their hips or legs. An extension arm 586 on which a servo 525 is mounted may connect to the operator interface 500 by a hinge. In various embodiments, the extension arm may firmly connect to the operator's upper thigh. The waist servo 525 of the torso pitch interface 522 may, for example, be a DYNAMIXEL™ AX-12 servo.

In some implementations, the vest 524 may provide a mount structure to which components of the operator interface 500 may be attached. The vest 524 may attach and anchor the operator interface 500 firmly to the operator's body.

In some implementations, the electronic back-box 526 (FIG. 5B) may be attached to the vest 524 and may contain electronic components associated with the operator interface 500. In some implementations, the electronic back-box 526 may contain an ARDUINO PRO MINI™ which captures the sensor signals from the potentiometers 570, 572, 580, and 582 and controls mounted on the vest 524, power boards for the DYNAMIXEL™ bus, a power-breakout board which may also act as a patch panel including patching of the hand sensor signals and some ground pins, an ODROID™ which handles the wireless adapter for Wi-Fi™ communication as well as a USB2AX, a Universal Serial Bus (USB) to Transistor-Transistor Interface (TTL) connector which allows the ODROID™ to send signals to the DYNAMIXEL™. The ODROID™ may also send signals to the ARDUINO PRO MINI™. The electronic back-box 526 may also contain an ARDUINO UNO™ that may receive or capture position information from the pedals 520.

The chest/shoulder support structure 528 allows for suspension of items included in operator interface from the frame rather than from the operator's limbs. In various embodiments, the chest/shoulder support structure 528 may facilitate transfer of the weight of the operator interface 500 off of the operator's arms and onto the operator's shoulder and back.

Figure 6:
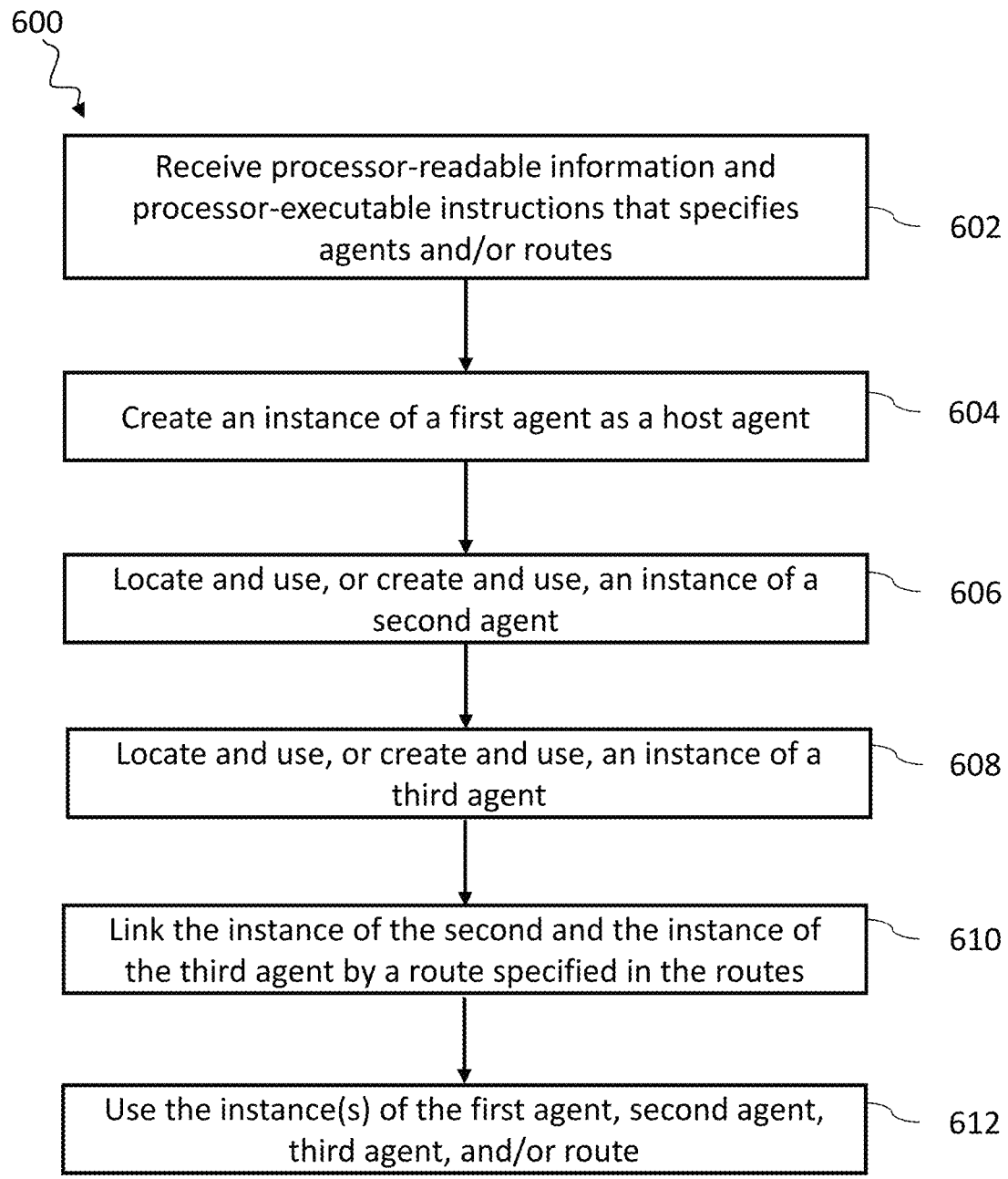
FIG. 6 is a flow-diagram illustrating an implementation of a method of operation of a distributed system in accordance with the present systems, devices, articles, and methods.

FIG. 6 shows method 600 executable by a controller, such as circuitry or at least one hardware processor, for operation in a distributed system. Method 600, in part, describes how a controller may create or use a plurality of agents. Those of skill in the art will appreciate that other acts may be included, removed, and/or varied or performed in a different order to accommodate alternative implementations. Method 600 is described as being performed by a controller, for example, a control subsystem or processor(s) in computer system 106 in conjunction with other components, such as, components of system 100. However, method 600 may be performed by multiple controllers or by another system.

For performing part, or all, of method 600, the controller may be at least one hardware processor. A hardware processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. The hardware processor may be referred to herein by the singular, but may be two or more processors. For performing part or all of method 600 one or more robots may be included in the operation of a distributed system. Exemplary robots are described herein.

Method 600 begins, for example, in response to an invocation by the controller. At 602, the controller receives processor-readable information and -executable instructions that specify or define one or more roles, agents, and/or routes. For example, a controller receives a document that includes the processor-readable information and -executable instructions. The role(s), agent(s), and/or route(s) could include information and/or instructions that specify a plurality of agents which fill, or assume, a plurality of roles. The plurality of agents could comprise a first agent, a second agent, and a third agent. The processor-executable instructions, when executed, for example define instances of the plurality of agents. An agent or a role may be associated with a set of processor-executable instructions and/or processor-readable information.

The processor-readable information and -executable instructions may include information that specifies a plurality of routes amongst the plurality of agents. The plurality of routes may comprise a first route.

At 604, the controller creates an instance of the first agent as a host agent. For example, the control executes a set of processor-executable instructions that defines, or defines in part, a first agent. The execution of the processor-executable instructions instantiates the first agent. A host agent is an agent associated with a processor-based device. For example, the instance of the first agent runs on a first processor-based device. A host agent may convey or transport messages between two agents running on the processor-based device. For example, a host agent may detect a worker agent has crashed and in response generate a signal that includes information that represents or indicates that the worker agent has crashed. See description herein at least with respect to FIG. 14.

At 606, the controller tries to locate, e.g., searches for, an instance of a second agent. An identity or location (e.g., network location) of the second agent may have been specified in information received in act 602. At 606, if the controller fails to locate the instance of the second agent, the controller creates or spawns an instance of the second agent. The controller creates an instance by executing processor-executable instructions. At 606, the controller may use or begin to use the second agent in performing further tasks. For example, the second agent may fill a role defined in a blueprint or set of instructions or set of specifications.

At 608, the controller tries, or attempts, to locate an instance of a third agent, e.g., running instance previously instantiated. An identity or location of the third agent may have been specified in information received in act 602. For example, the controller could seek a third agent with specified qualities or requirements such as is a hardware agent, is a video agent, is found on a particular host, or the like. The requirements could be defined in processor-readable information, such as flags, e.g., has_audio flag. At 608, if the controller fails to locate the instance of the third agent, the controller creates, or spawns, an instance of the third agent. The controller may use or begin to use the third agent in performing further tasks. For example the third agent may fulfill or fill a role defined in a blueprint or set of instructions or set of specifications.

At 610, the controller links, e.g., brings into communication with, the instance of the second agent and the instance of the third agent by a route. The route(s) received at 602 may specify the route or routing that links the instance of the second agent and the instance of the third agent.

At 612, the controller uses the instances of the first agent, second agent, third agent, and/or the routes. For example, the controller processes data at the instance of the second agent and sends a result to the instance of the third agent via a route in the routes.

In some implementations, one or more of the agents is a worker agent. For example, the instance of the second agent and the instance of the third agent are each respective instances of worker agents.

In some implementations, one or more of the agents is a supervisor agent. For example, the instance of the first agent is a supervisor agent. A supervisor agent may be designed to perform a function or a task. A supervisor agent may coordinate two or more worker agents. Thus, one or more worker agents may be subservient to one or more supervisor agents, carrying out functions or tasks as directed by the supervisor agent(s). A supervisor agent may tell an agent when to start, stop, and which agents to communicate with. Supervisor agent can dynamically turn off and on agents, add routes, and generally orchestrate complex interactions.

In some implementations, one or more of the agents is a blueprint supervisor agent. For example, the instance of the first agent is a blueprint supervisor agent. A blueprint supervisor agent may be designed to perform a function or a task as defined in a blueprint or set of instructions or set of specifications. A blueprint supervisor agent may coordinate two or more agents including supervisor agents and/or worker agents. A blueprint includes processor-readable information and -executable instructions that specifies or define one or more agents and/or routes. A blueprint can also refer to a collection of agents and roles defined in a blueprint or set of instructions or set of specifications.

The agents may be hardware or software agents. An example of a hardware agent is an agent associated with a sensor. An example of a software agent is an agent to process information received from a hardware agent associated with a sensor.

Figure 15:
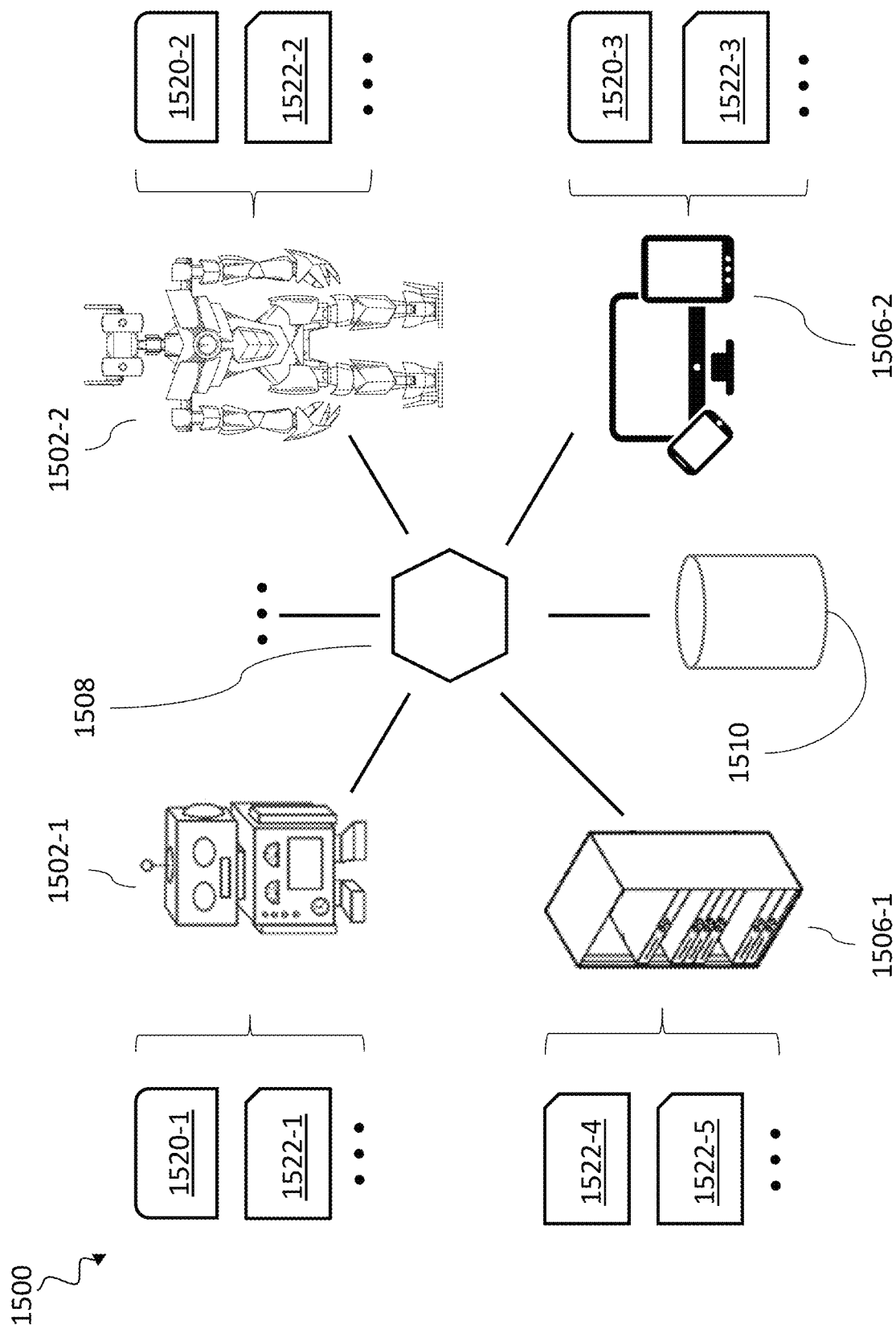
FIG. 15 is a schematic diagram illustrating a portion of a distributed system including a robot, and a computer system, in accordance with the present systems, devices, articles, and methods.

A role is an example of a blueprint element, element, or block defined a plurality of distributed sets of processor-executable instructions. Examples of elements include roles and assemblies. A role is a task or function that may be performed by an agent. A role includes one or more input and/or output terminals. The terminals map to the channels used by agents for communications. An assembly is an aggregation of role(s) and route(s). An assembly can include one or more assemblies. An assembly can have a task or function to be assembled or performed by one or more agents. For example, a supervisor agent and a worker agent. An assembly includes one or more input and/or output terminals to the role. A blueprint can also be referred to as an assembly. Examples of roles and assemblies are shown in FIG. 15 and described in relation to at least that figure.

Method 600 ends until invoked again.

Figure 7:
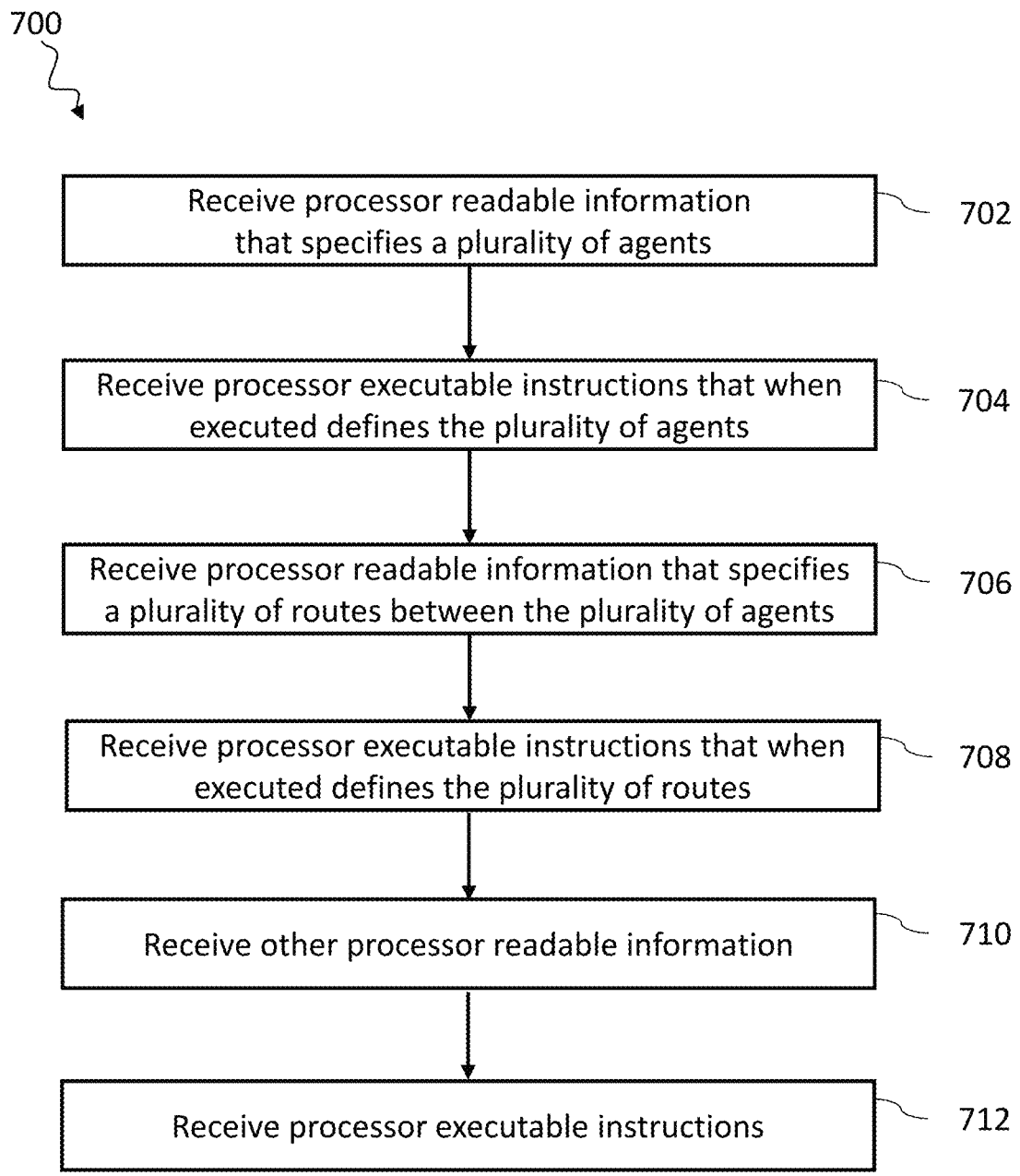
FIG. 7 is a flow-diagram illustrating an implementation of a method of operation of a distributed system in accordance with the present systems, devices, articles, and methods.

FIG. 7 shows method 700 executable by a controller, such as circuitry or at least one hardware processor, for operation in a distributed system. Method 700, in part, describes how a controller may create a plurality of agents and/or routes. Those of skill in the art will appreciate that other acts may be included, some acts omitted, and/or some acts varied or performed in a different order to accommodate alternative implementations. Method 700 is described as being performed by a controller, however, method 700 may be performed by multiple controllers or by another system.

Method 700 begins, for example, in response to an invocation by the controller. At 702, the controller receives processor-readable information that specifies a plurality of agents. At 704, the controller receives processor-readable and -executable instructions that when executed defines (e.g., create and maintain) one or more instances of the plurality of agents.

At 706, the controller receives processor-readable information that specifies a plurality of routes between the plurality of agents. At 708, the controller receives processor-executable instructions that when executed defines (e.g., create and maintain or establish) the plurality of routes.

At 710, the controller receives other processor-readable information. At 712, the controller receives other processor-executable instructions. Method 700 ends until invoked again.

Figure 8A:
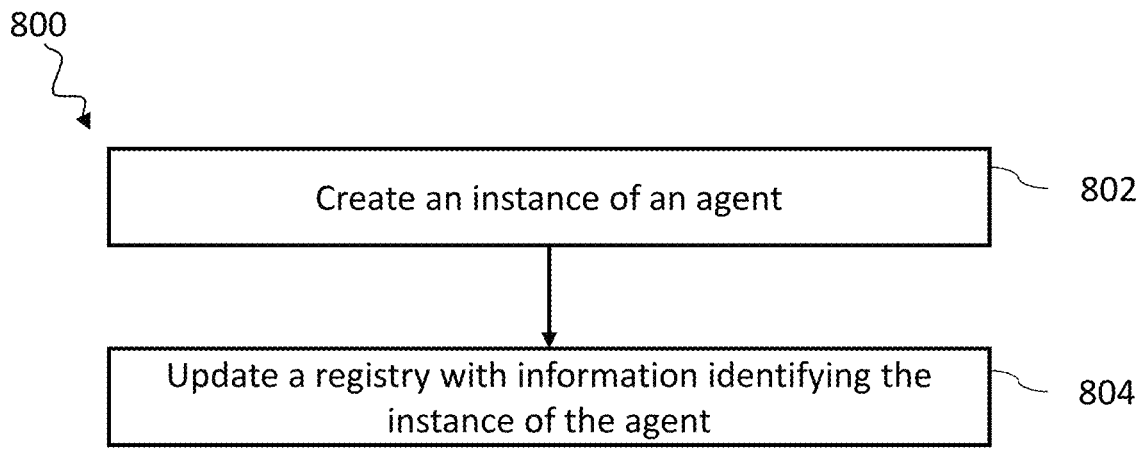
FIG. 8A and FIG. 8B are flow-diagrams illustrating implementations of methods of operation of a distributed system in accordance with the present systems, devices, articles, and methods.
Figure 8B:
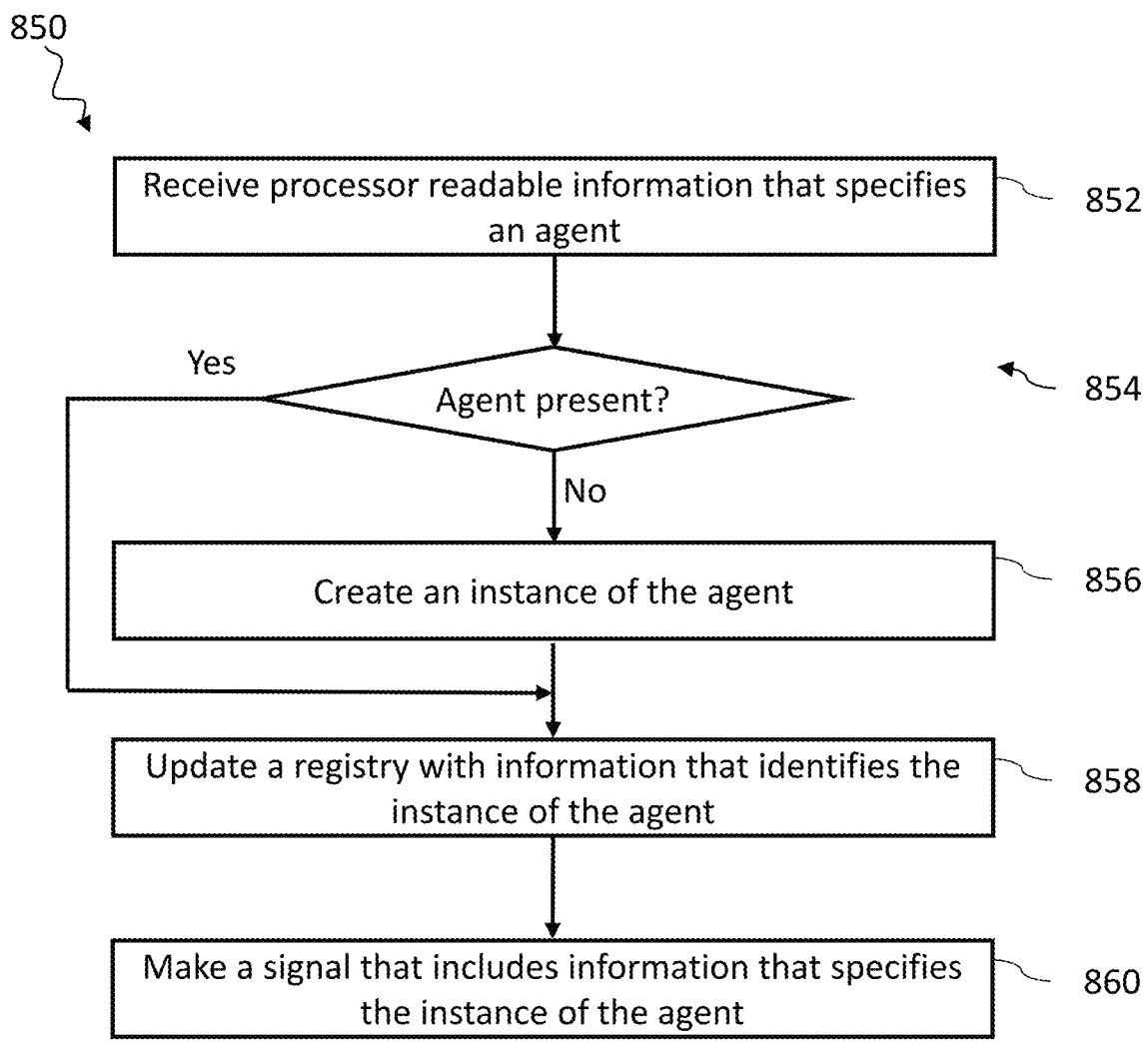

FIGS. 8A and 8B show methods 800 and 850 executable by a controller, such as circuitry or at least one hardware processor, for operation in a distributed system. Method 800, in part, describes how a controller may attempt to locate one or more agents. Those of skill in the art will appreciate that other acts may be included, some acts omitted, and/or some acts varied or performed in a different order to accommodate alternative implementations. Method 800 is described as being performed by a controller, however, method 800 may be performed by multiple controllers or by another system.

At 802, the controller creates or generates or spawns an instance of an agent. That is, the controller executes processor-executable instructions that define the agent and in response instantiates the agent. For example, the controller executes processor-executable instructions that define an implementation of method 700.

At 804, the controller updates a registry with information that identifies (e.g., name, unique identifier) the instance of the agent. The registry includes processor-readable information stored on or within at least one tangible non-transitory storage device. A host agent can access the registry. A registry may be unique to a host agent or shared between host agents and include processor readable information that specifies a host agent associated with a respective instance of an agent. Thus an agent can be registered with a host agent.

Method 800 ends until invoked again.

FIG. 8B shows method 850 executable by a controller, such as circuitry or at least one hardware processor, for operation in a distributed system. Method 850, in part, describes how a controller may try to locate a plurality of agents. Those of skill in the art will appreciate that other acts may be included, some acts omitted, and/or some acts varied or performed in a different order to accommodate alternative implementations. Method 850 is described as being performed by a controller, for example, a control subsystem or processor(s) in computer system 106 in conjunction with other components, such as, components of system 100. However, method 850 may be performed by multiple controllers or by another system.

At 852, the controller receives processor-readable information that specifies an agent. For example, the agent is a worker software agent. The information could specify qualities definite or desirable, for example indicating whether the agent is a hardware agent, is a video agent, is found on a particular host, has_audio flag set, is located in certain place or device, and the like. At 854, the controller checks if the agent is present. At 856 (854—No), the controller creates, instantiates or spawns an instance of the agent. Processing continues at 858. At 858 (854—Yes and/or after 856), the controller updates a registry with information (e.g., unique identifier) that identifies the instance of the agent. For example, the controller registers the instance of the agent with a host agent.

At 860, the controller creates a signal that includes information that specifies the instance of the agent. The controller may use the signal to update a processor-readable storage medium, or send the signal across one or more communications channels. Method 850 ends until invoked again.

Figure 9:
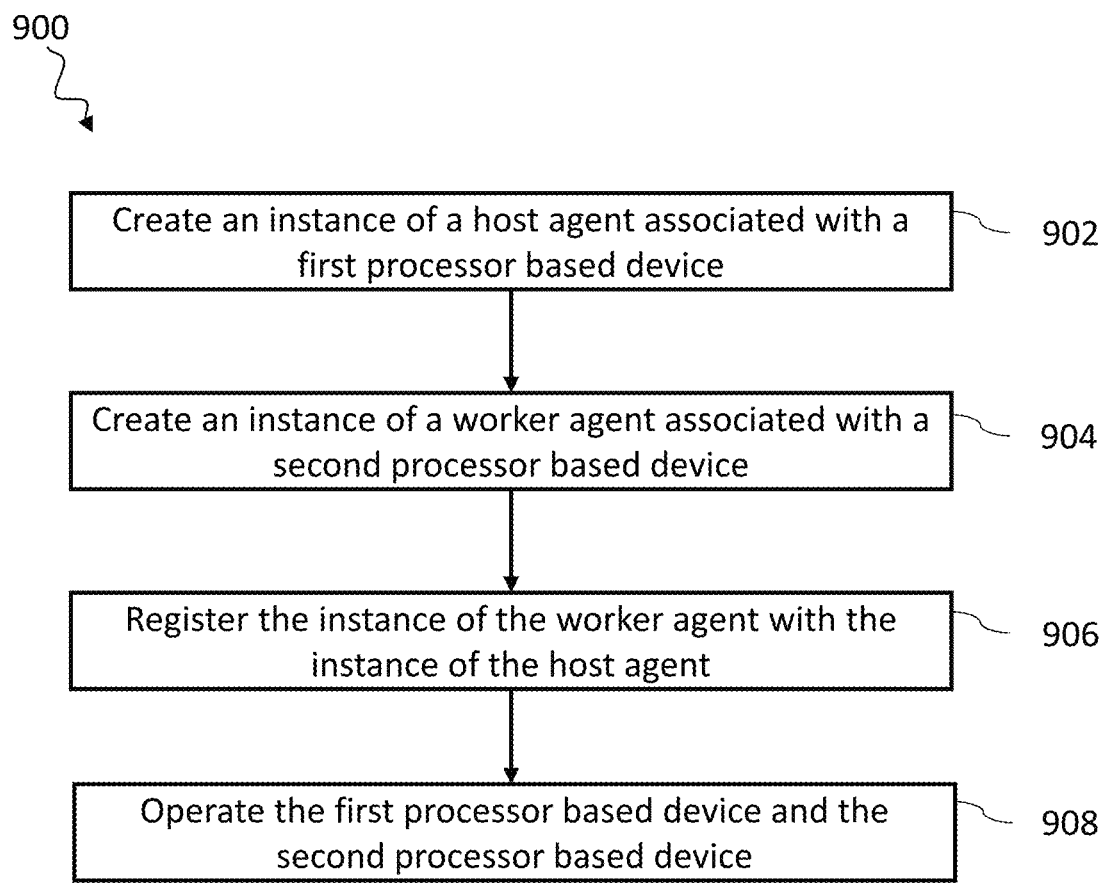
FIG. 9 is a flow-diagram illustrating an implementation of a method of operation of a distributed system in accordance with the present systems, devices, articles, and methods.

FIG. 9 shows method 900 executable by a controller for operation in a distributed system. Method 900, in part, describes how a controller may create one or more instances of a host agent and a worker agent, for example on different respective processor-based devices. Those of skill in the art will appreciate that other acts may be included, some acts omitted, and/or some acts varied or performed in a different order to accommodate alternative implementations. Method 900 is described as being performed by a controller, for example, a control subsystem or processor(s) in computer system(s) 106 in conjunction with other components, such as, components of system 100. However, method 900 may be performed by multiple controllers or by another system.

At 902, the controller creates an instance of a host agent on a first processor-based device. At 904, the controller creates an instance of a worker agent on a second processor-based device. At 906, the controller updates registry (e.g., updates a processor readable data structure stored on or within at storage device) to represent the instance of the worker agent and with the instance of the host agent. At 908, the first processor-based device and the second processor-based device operate in a distributed system.

Figure 16:
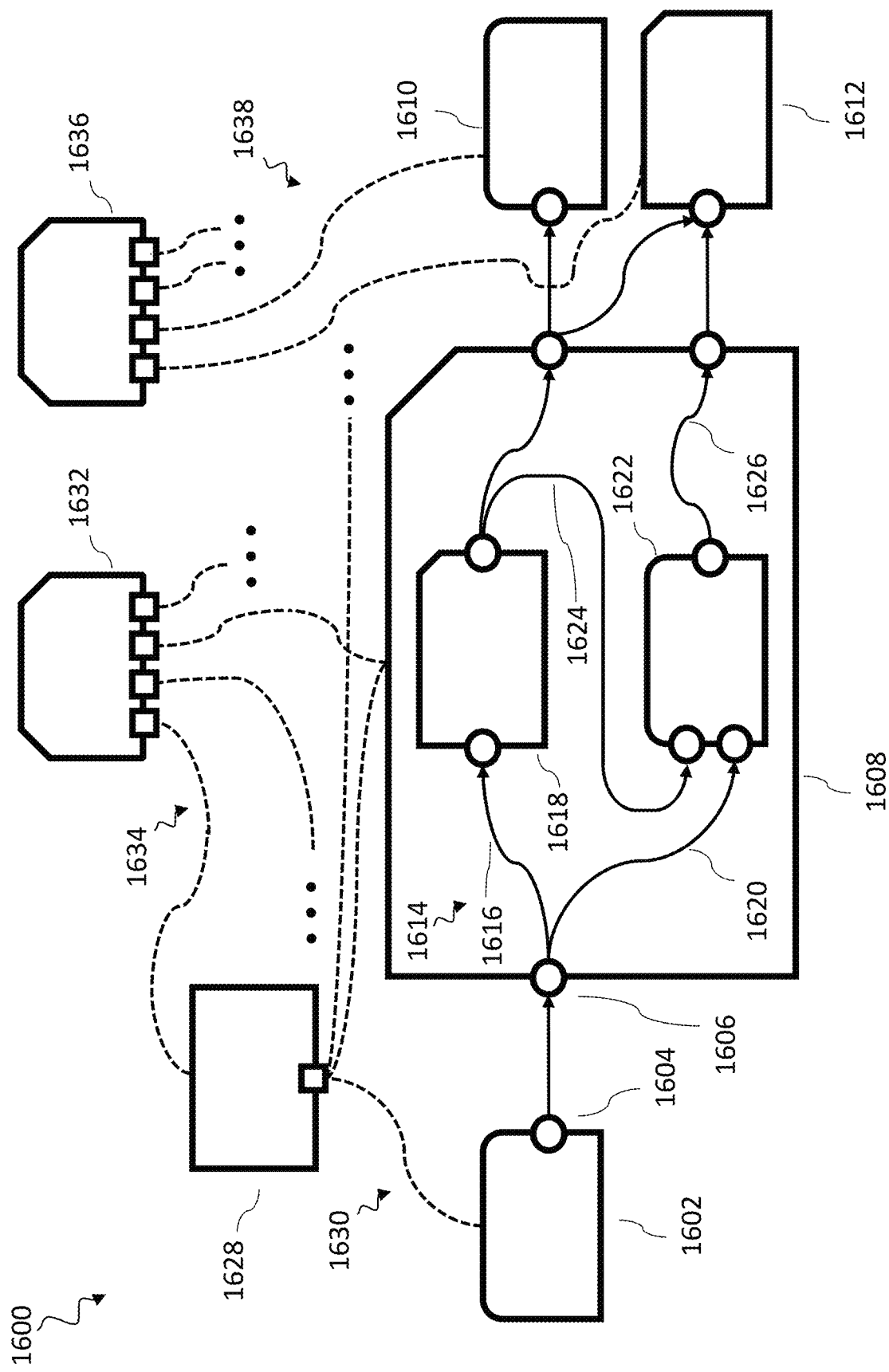
FIG. 16 is a schematic diagram illustrating a plurality of agents including roles, assemblies, and routes in accordance with the present systems, devices, articles, and methods.

Examples of instances of agents defined on different processor-based devices is described in relation to, at least, FIG. 16. Method 900 ends until invoked again.

Figure 10A:
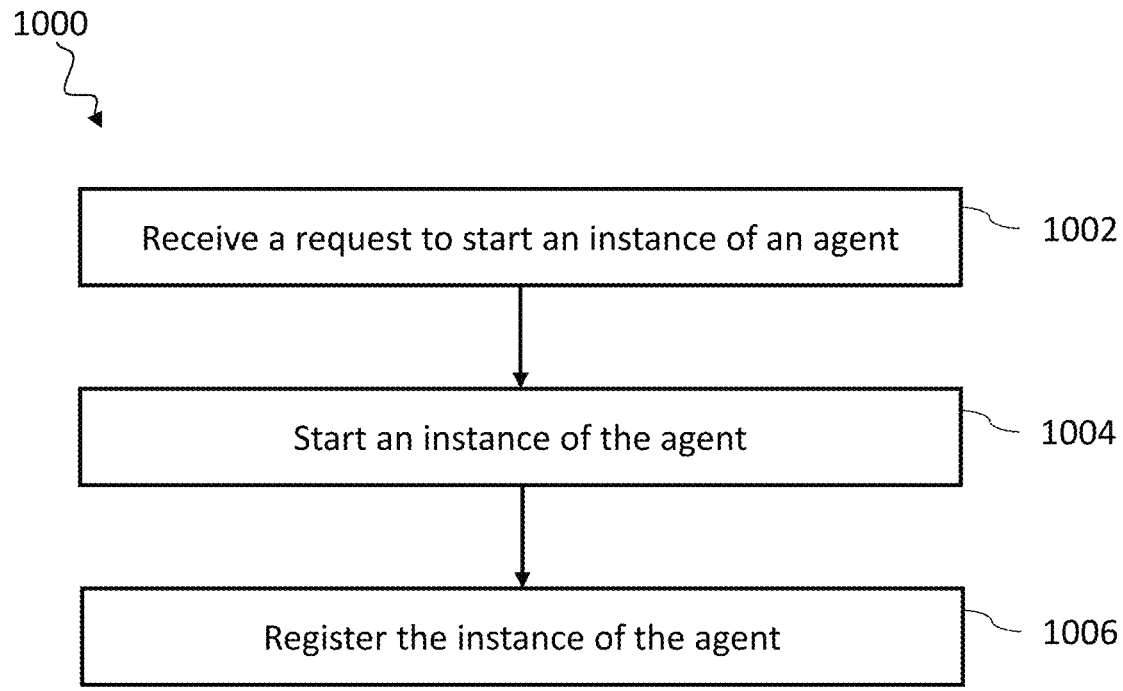
FIG. 10A and FIG. 10B are flow-diagrams illustrating implementations of methods of operation of a distributed system that comprise causing an agent to start or to stop, in accordance with the present systems, devices, articles, and methods.
Figure 10B:
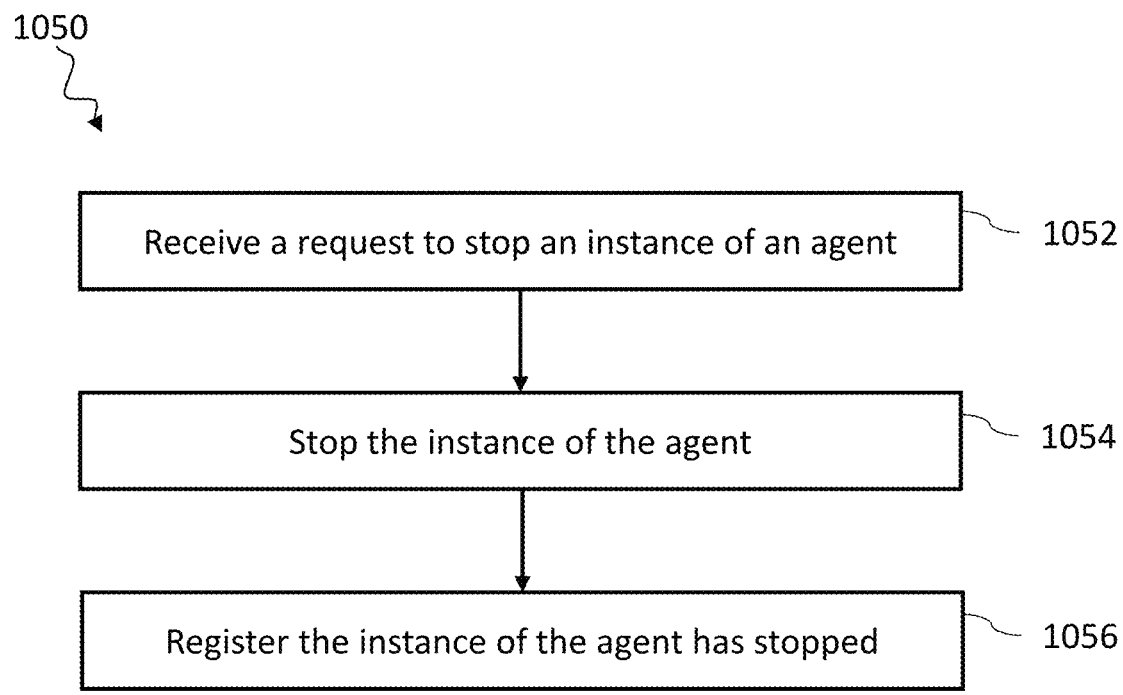

FIGS. 10A and 10B shows methods 1000 and 1050 executable by a controller for operation in a distributed system. Methods 1000 and 1050, in part, describe how a controller may start an agent or stop an agent. Those of skill in the art will appreciate that other acts may be included, some acts omitted, and/or the acts may be varied or performed in a different order to accommodate alternative implementations. Methods 1000 and 1050 are described as being performed by a controller but may be performed by multiple controllers or by another system.

In method 1000 shown in FIG. 10A, the controller receives a request to start an agent at 1002. For example, the controller receives a request to start or instantiate an instance of a worker agent. The agent may be a supervisor agent, a blueprint supervisor agent, or a worker agent. At 1004, in response to executing instructions, the controller starts, creates, instantiates or spawns an instance of the agent. At 1006, the controller updates (e.g., updates a processor readable data structure stored on or within at storage device) the instance of the agent. The controller may register the instance of the agent with a host agent, e.g., update a registry.

In method 1050 show in FIG. 10B, at 1052, the controller, receives a request to stop an instance of an agent. For example, receives a request to stop an instance of a worker agent previously started. The instance of the agent may be a supervisor agent, a blueprint supervisor agent, or a worker agent. The request may include a request to stop more than one agent. Methods, defined in processor-executable instructions, to start or stop a plurality of agents are described herein at, at least, FIGS. 11A and 11B.

At 1054, in response to executing instructions, the controller stops the instance of the agent. For example, the controller sets the state of the instance of the agent in inactive. That is causes the instance of the agent to stop. At 1056, the controller updates a registry (e.g., updates a processor readable data structure stored on or within at storage device) to show the instance of the agent has stopped. The routes incident on the instance of the agent are also stopped. An example of stopping and starting agents is described in relation to, at least, FIG. 17. In some implementations an agent may be stopped by placing the agent in an inactive state. In other implementations, an agent may be stopped by terminating the existence of the agent.

Figure 11A:
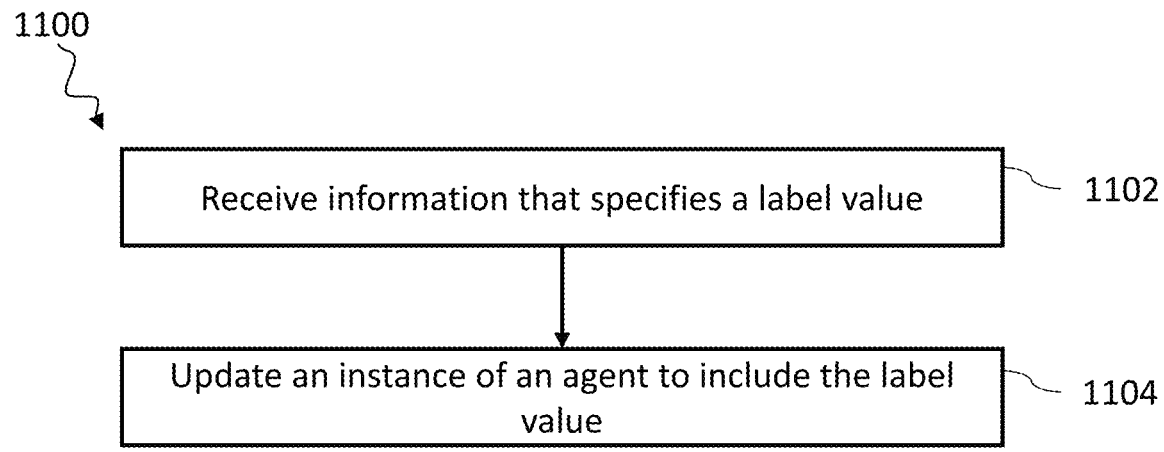
FIG. 11A and FIG. 11B are flow-diagrams illustrating implementations of methods of operation of a distributed system in accordance with the present systems, devices, articles, and methods.
Figure 11B:
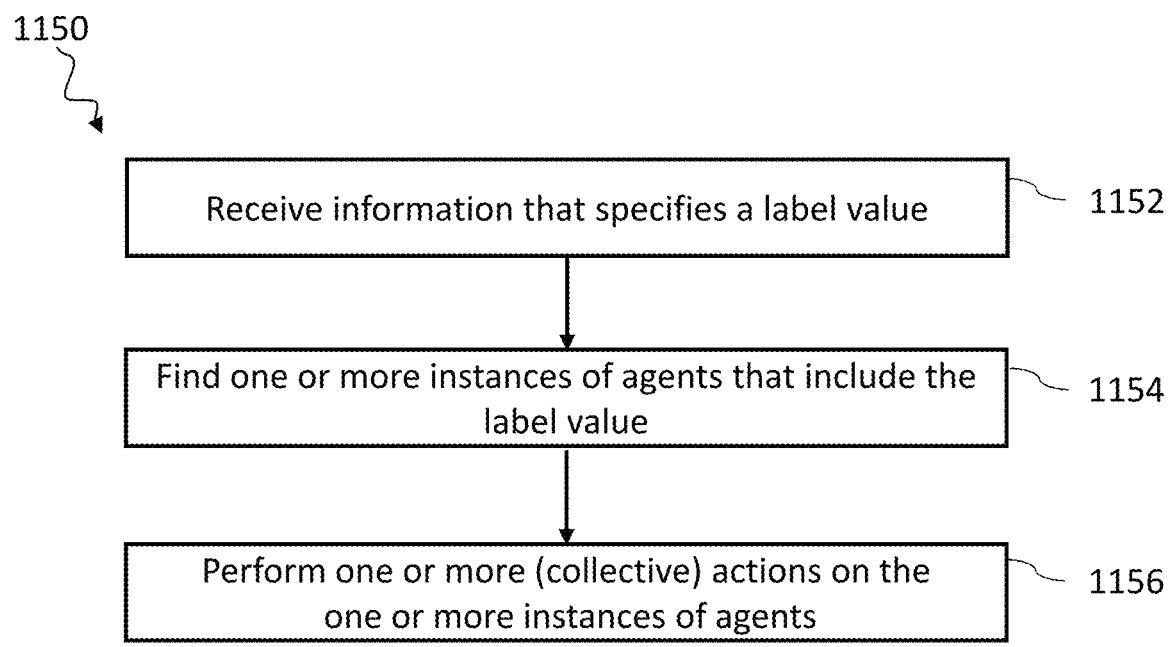

FIGS. 11A and 11B shows methods 1100 and 1150 executable by a controller for operation in a distributed system. Methods 1100 and 1150, in part, describe how a controller may make use of labels in the operation of agents. Those of skill in the art will appreciate that other acts may be included, some acts omitted, and/or some acts varied or performed in a different order to accommodate alternative implementations. Methods 1100 and 1150 are described as being performed by a controller, for example, a control subsystem or processor(s) in computer system 106 in conjunction with other components, such as, components of system 100. However, methods 1100 or 1150 may be performed by multiple controllers or by another system.

Figure 17:
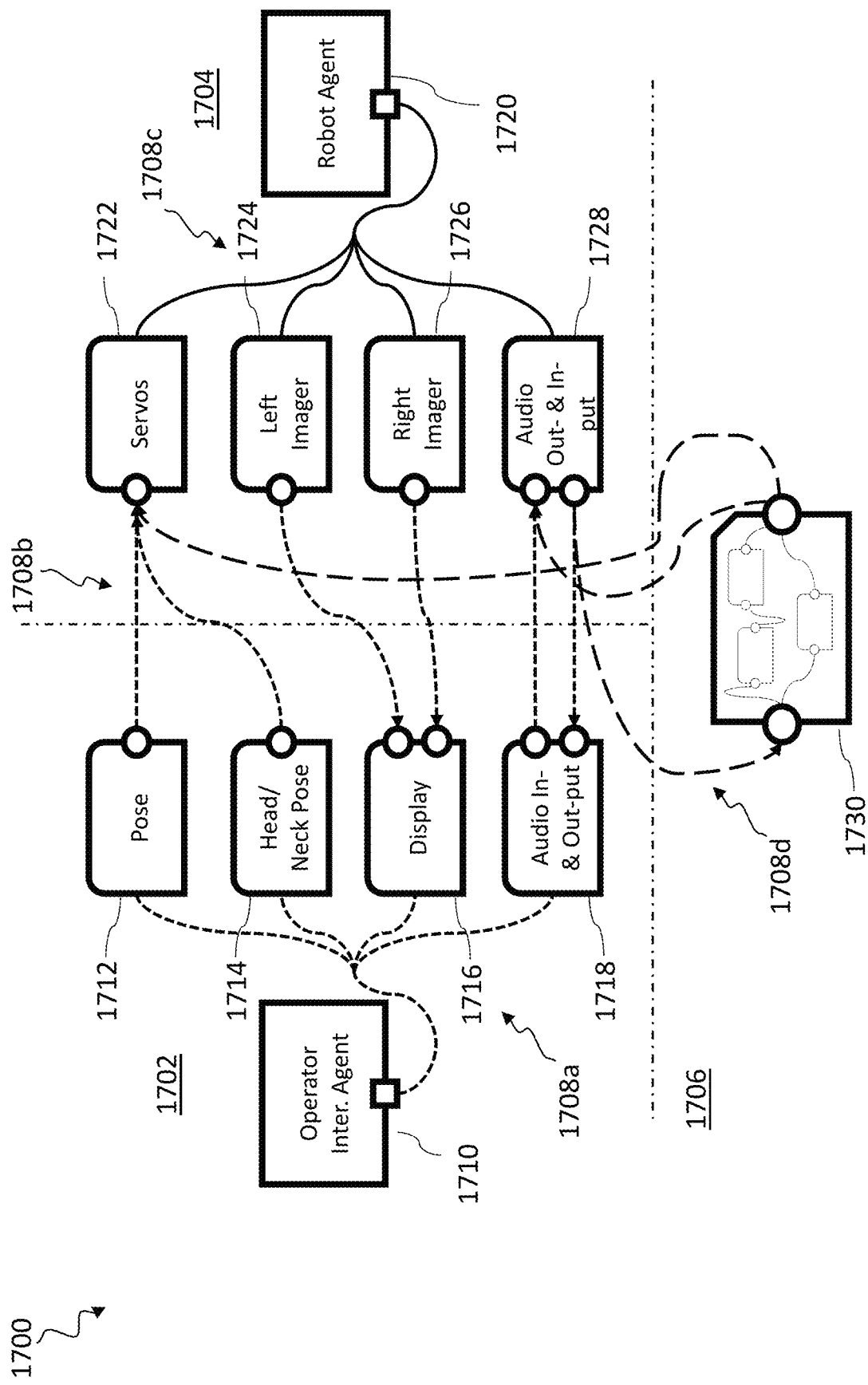
FIG. 17 is a schematic diagram illustrating a plurality of agents in accordance with the present systems, devices, articles, and methods.

Method 1100 begins at 1102. The controller receives information that specifies a label value that identifies at least one characteristic of the agent or categories the agent. One or more agents may share the same label value. An agent, or an instance of an agent, may include a label. The label can be blank or include a label value. At 1104, the controller updates information identifying an instance of an agent to include the label value. For example, all the agents associated with an operator interface could be updated to include the label value "operator interface", "suit", or the like. Examples of agents labeled operator interface are shown in FIG. 17. Method 1100 ends until invoked again.

Method 1150 begins at 1152. The controller receives information that specifies a label value. At 1154, the controller finds one or more instances of agents that include the label value. For example, the controller finds at least one instance of an agent that includes or is associated with the particular label value. The controller may find a plurality of instances of one or more agents that includes or is associated with the particular label value. At 1156, the controller performs one or more actions on the one more instances of agents that include or are associated with the particular label value. That is, the controller may perform a collective action on all instances of agents that include or are associated with the particular label value.

At 1156, the controller could start a plurality of instances of agents where each agent includes or is associated with a particular label value. The controller could stop (e.g., suspend or inactivate) a plurality of instances of agents where each agent includes or is associated with a particular label value. The controller could coordinate communication amongst a plurality of instances of agents that include or is associated with a particular label value. For example, the controller could dynamically change one or more routes from active to inactive. That is, the routes could change depending on which agents have stopped or started, that is, are inactive or active. The controller could coordinate the operation of a plurality of instances of agents that include or is associated with a particular label value. The controller, for example, can update a plurality of instances of agents that include or is associated with a particular label value. Collective actions on agents is illustrated herein at least with respect to FIG. 17. Method 1150 ends until invoked again.

Figure 12:
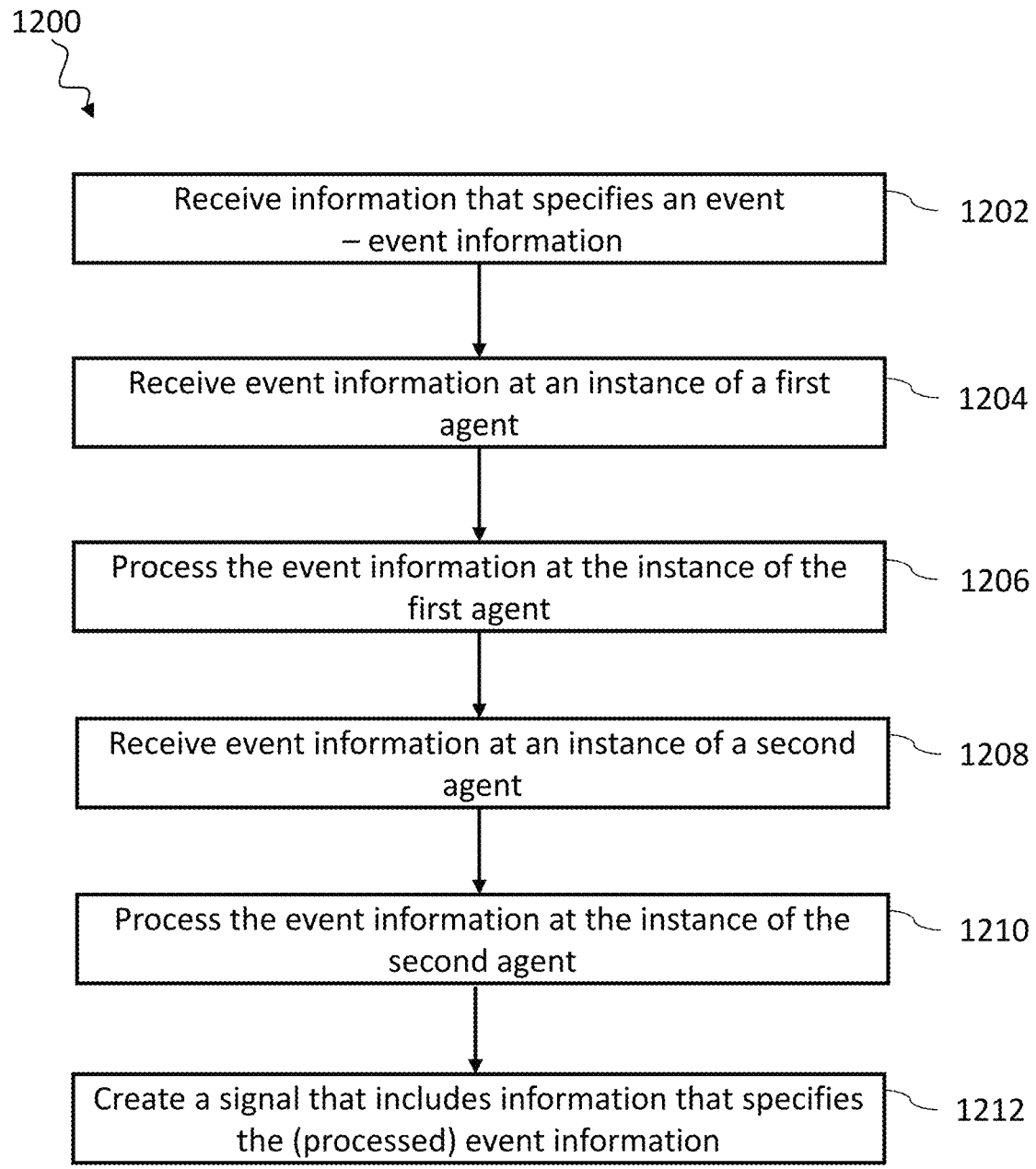
FIG. 12 is a flow-diagram illustrating an implementation of a method of operation of a distributed system in accordance with the present systems, devices, articles, and methods.

FIG. 12 shows method 1200 executable by a controller for operation in a distributed system. Method 1200, in part, describes how a controller may manage information that represents events in distributed system(s). The controller may receive, process, and pass information that represents events. Those of skill in the art will appreciate that other acts may be included, some acts omitted, and/or some acts varied or performed in a different order to accommodate alternative implementations. Method 1200 is described as being performed by a controller, for example, a control subsystem or processor(s) in computer system(s) 106 in conjunction with other components, such as, components of system 100. However, method 1200 may be performed by multiple controllers or by another system.

Method 1200 begins at 1202. The controller receives event information. That is, the controller receives processor-readable information that specifies an occurrence of an event. For example, the controller may receive information from a sensor associated with a component of system 100, e.g., robot 102, computer system 106.

At 1204, the controller receives event information at an instance of a first agent. At 1206, the controller processes the event information at the instance of the first agent. At 1208, the controller receives event information at an instance of a second agent. That is, the instance of the first agent may have passed the event information to the instance of the second agent for example as part of in processing the event information by the first agent. At 1210, the controller processes the event information at the instance of the second agent. At 1212, the controller creates a signal that includes information that specifies the (processed) event information.

Method 1200 ends until invoked again.

Figure 13:
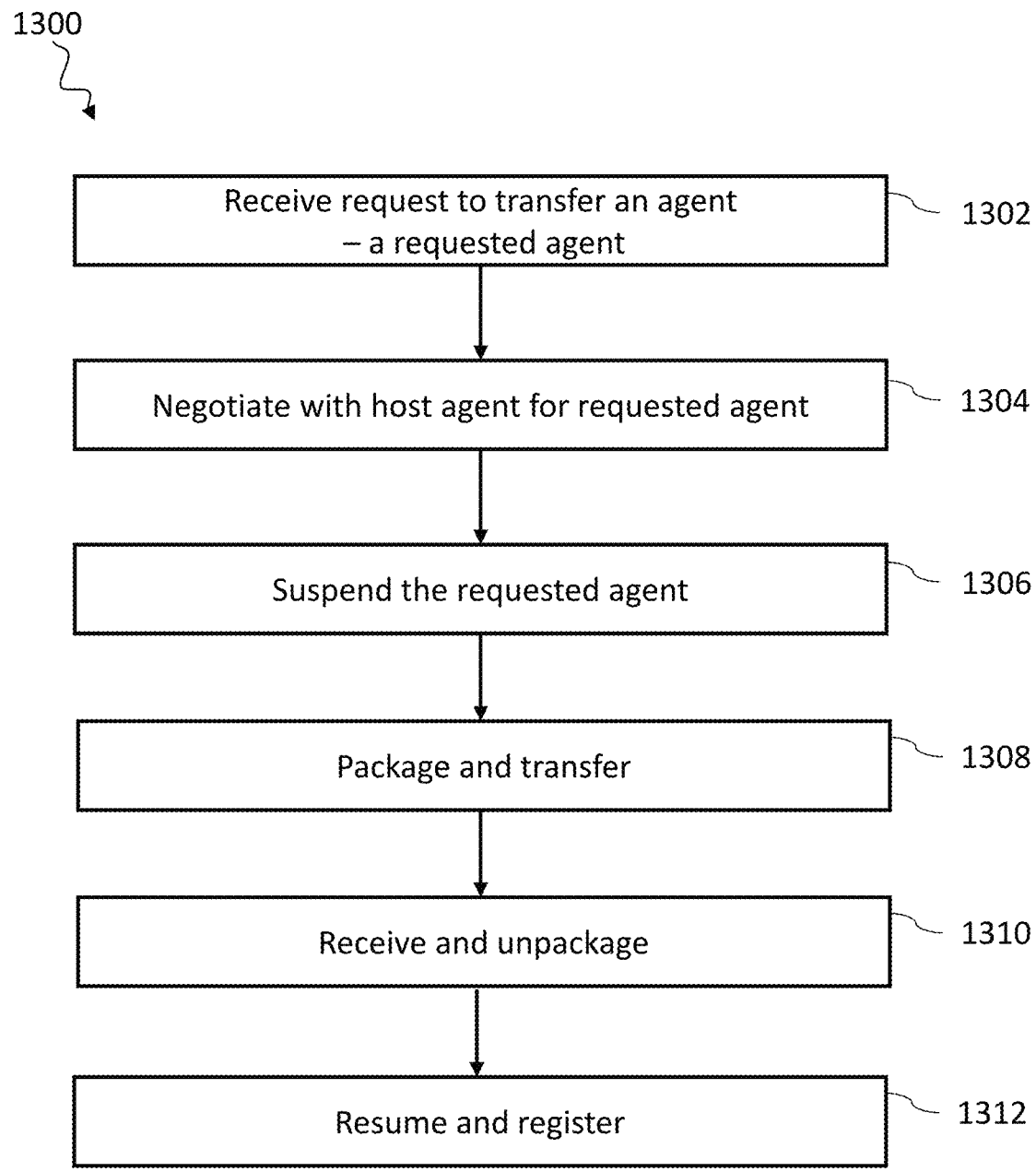
FIG. 13 is a flow-diagram illustrating an implementation of a method of operation of a distributed system in accordance with the present systems, devices, articles, and methods.

FIG. 13 shows method 1300 executable by a controller for operation in a distributed system. Method 1300, in part, describes how a controller may transfer agents in distributed systems. Those of skill in the art will appreciate that other acts may be included, some acts omitted, and/or some acts varied or performed in a different order to accommodate alternative implementations. Method 1300 is described as being performed by a controller, for example, a control subsystem or processor(s) in computer system(s) 106 in conjunction with other components, such as, components of system 100. However, method 1300 may be performed by multiple controllers or by another system.

Method 1300 begins a 1302. At 1302, a first host agent, being executed by a controller, receives a request to transfer an agent on a first host to a second host—the requested agent. At 1304, the first host agent and the second host agent (for the second host) negotiate over the requested agent. For example, the host agents can determine if the requested agent is active. The host agents can determine if the requested agent fulfils a requested role for the second host agent.

At 1306, the first host agent suspends the requested agent. Suspend may be placing the agent in an inactive state or a third state compared to active state and inactive state. The controller, executing processor-readable instructions that define the first host agent, packages the, now suspended, requested agent. The controller can define the requested agent and, optionally, the state of the current agent in a self-descriptive data format like JSON or XML.

At 1308, the first host agent transfers the packaged, suspended, and requested agent to the second host via the second host agent. At 1310, the second host agent receives and unpackages the requested agent.

At 1312, the second host agent resumes the requested agent on the second host. The second host agent registers the requested agent. Examples of a process defined in processor-executable instructions to register an agent are described herein at, at least, FIG. 9. Method 1300 ends until invoked again.

Figure 14:
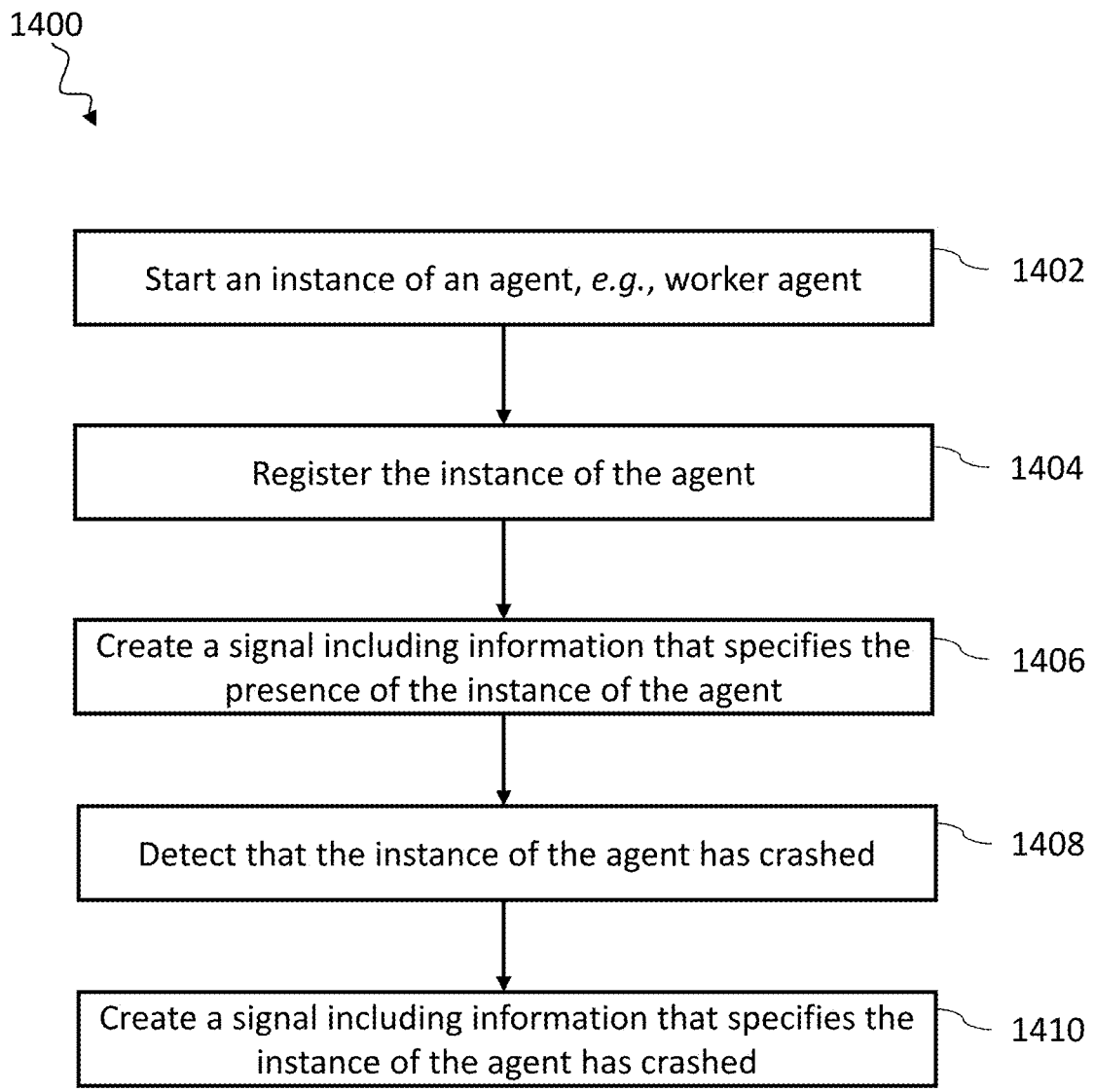
FIG. 14 is a flow-diagram illustrating an implementation of a method of operation of a distributed system in accordance with the present systems, devices, articles, and methods.

FIG. 14 shows method 1400 executable by a controller for operation in a distributed system. Method 1400, in part, describes how, a controller may manage instances of a host agent and a worker agent. Those of skill in the art will appreciate that other acts may be included, some acts omitted, and/or some acts varied or performed in a different order to accommodate alternative implementations. Method 1400 is described as being performed by a controller, for example, a control subsystem or processor(s) in computer system(s) 106 in conjunction with other components, such as, components of system 100. However, method 1400 may be performed by multiple controllers or by another system.

At 1402, the controller, in response to executing instructions that define a host agent, starts an instance of a worker agent. For example, set the agent to active state. At 1404, the controller updates (e.g., updates a processor readable data structure stored on or within at storage device) the instance of a worker agent. The controller may register the instance of a worker agent with a host agent, e.g., update a registry. At 1406, the controller creates a signal including information that specifies the presence of the instance of the worker agent. In some implementation, the information may additionally identify the instance of the worker agent, for example via a unique identifier.

At 1408, which may be some time later (e.g., runtime), the controller may detect that the instance of the worker agent has crashed. At 1410, in response to detection of the crash the controller creates a signal including information that specifies the instance of the worker agent has crashed. Method 1400 ends until invoked again.

FIG. 15 is a schematic diagram illustrating a portion of a system 1500 including one or more robots, and computer systems. System 1500 includes a plurality of robots 1502-1, 1502-2, (two shown, singularly or collectively 1502). System 1500 includes a plurality of computer systems, e.g., computer systems 1506-1, 1506-2 (two shown, collectively 1506).

Robot(s) 1502 and computer system(s) 1506 are in communication with each other and other subsystems or systems via one or more network or non-network communication channel(s) 1508. System 1500 may include at least one storage device 1510 coupled to communication channel(s) 1508, included in robot(s) 1502, included in computer system(s) 1506, and the like. Further systems, e.g., processor-based device(s), robot(s), computer system(s), and storage device(s)) can be coupled to the communication channel(s) 1508.

An instance of a first host agent may run on a robot, e.g., robot 1502-1. An instance of a first host agent may run on a computer system, e.g., computer system 1506-1.

Robot(s) 1502 perform at least one task within an environment associated with the robot(s) 1502. In performing the at least one task, robot(s) 1502 and computer system(s) 1506 may execute or be directed by one or more agents. The one or more agents can fulfill a role or an assembly. The one or more agents can be a worker agent, a supervisor agent, a host agent, or the like.

Robot 1502-1 includes a control subsystem, e.g., control subsystem 303, that executes processor-executable instructions to define role 1520-1. The control subsystem could execute processor-executable instructions to define assembly 1522-1. Robot 1502-1 could be associated with further role(s) and/or assembly(ies). Robot 1502-2 and computer system(s) 1506 may be associated with further roles (e.g., role 1520-2, role 1520-3) and/or assemblies (e.g., assembly 1522-2, assembly 1522-3, assembly 1522-4, and assembly 1522-5).

FIG. 16 is a schematic diagram illustrating a portion of an exemplary collection of agents, routes, assemblies, and roles (blueprint 1600). Blueprint 1600 may be an implementation of a blueprint by agents, supervisor agents and/or host agents. Blueprint 1600 may comprise a graph including elements (e.g. roles and assemblies) as nodes and routes as edges.

For the description of FIG. 16 one agent fulfills one role or assembly without loss of generality. Thus the agents fulfilling roles and assemblies can be unambiguously identified by role or assembly. Blueprint 1600 includes a role 1602. Role 1602 includes input and output terminals, such as, output terminal 1604. The output of role 1602 is provided via output terminal 1604 to input terminal 1606 of assembly 1608 via a route disposed between output terminal 1604 and input terminal 1606. The output of assembly 1608 is provided via one or more output terminals and routes to one or more input terminals of one or more assemblies or roles. For example, a first output terminal of assembly 1608 is in communication with an input terminal of role 1610. As shown a second output terminal of assembly 1608 is in communication with an input terminal of an assembly 1612.

Assembly 1608 includes a graph 1614. Graph 1614 includes a first route 1616 from the input terminal of assembly 1608 to assembly 1618. Graph 1614 includes a route 1620 from an "input" terminal, itself in communication with the output terminal 1604 included in role 1602, to an input terminal of role 1622.

The output terminal of a role, or assembly, included in an assembly may be in communication with an input terminal of a role, or assembly, in the same assembly. See, for example, route 1624. An assembly can characterized by a graph that may be a tree, acyclic graph, cyclic graph, or the like.

The output terminal of a role or assembly in a greater assembly may be in communication with the output terminal of the greater assembly. For example, route 1626 in graph 1614 leads from leads from role 1622 to an output terminal of assembly 1608.

A graph like blueprint 1600 and graph 1614 can include various branches and joins. Two or more routes can lead to one input terminal. See, for example, the routes incident on the input terminals included in assembly 1612. Two or more routes can lead from one from one input terminal of an assembly, e.g., input terminal of assembly 1608. Two or more routes can lead from one output terminal, e.g., output terminal of assembly 1618. A role or assembly may have a plurality of input terminals, e.g., role 1622, or output terminals, e.g., assembly 1608.

Blueprint 1600 includes a blueprint supervisor agent 1628. The blueprint supervisor agent 1628 is in communication with the worker agents that fill the roles and assemblies of included in blueprint 1600. For example, arcs 1630 denote assembly 1608 is being performed by an agent supervised by blueprint supervisor agent 1628.

Blueprint 1600 includes one or more second supervisor agents. The supervisor agents are in communication with the agents that fill, or assume, the roles and assemblies of included in blueprint 1600.

As shown blueprint 1600 includes a first host agent 1632. In some implementations, the agents that fill roles are associated with different processor-based devices and each processor-based device is associated with a respective host agent. Each agent that fills at least a role, e.g., an agent can fill more than one role in an assembly, registers with a host agent, e.g., agent 1632. Host agent 1632 monitors each agent registered with it, denoted by arcs 1634 (incomplete for clarity).

As shown blueprint 1600 includes a second host agent 1636. In some implementations, the agents that fill roles are associated with different processor-based devices and each processor-based device is associated with a respective host agent. For example, role 1610 and assembly 1612 run on a different processor-based device. Each agent that fills at least a role, e.g., an agent can fill more than one role in an assembly, registers with a host agent, e.g., agent 1636. Host agent 1636 monitors each agent registered with it, denoted by arcs 1638 (incomplete for clarity).

FIG. 17 is a schematic diagram illustrating a portion of a plurality of agents 1700 including some agents that may be turned on or off (e.g., activated or suspended), and dynamic routes between agents. Plurality of agents 1700 includes a plurality of agents fulfilling a plurality of roles and a plurality of dynamic routes 1708 amongst the same. Plurality of agents 1700 includes a first sub-plurality of agents 1702; a second sub-plurality of agents 1704; and a third sub-plurality of agents 1706.

First sub-plurality of agents 1702 includes a first supervisor agent 1710 for the further agents in first sub-plurality of agents 1702. The role of a supervisor agent is described herein above for example at least, FIG. 16. First supervisor agent 1710 is in communication with agents 1712 through 1718 via routes 1708*a*. The first supervisor agent 1710 associated with the operation of an operator interface, e.g., operator interface 500.

First sub-plurality of agents 1702 includes a pose agent 1712 associated with the operation of an operator interface, e.g., operator interface 500. Here a pose agent is an agent fulfilling a pose role. Pose agent 1712 receives pose information from one more servos and/or sensors in operator interface about the pose of a body and/or appendages. Pose agent 1712 sends the body or appendage pose information, in processor readable or machine readable form, to second sub-plurality of agents 1704 via routes 1708*b*. Pose agent 1712 is shown as a role but may implement one or more roles or one or more assemblies.

First sub-plurality of agents 1702 further includes head/neck pose agent 1714 to receive pose information about the pose of a human operator's head. Here a head/neck pose agent is an agent fulfilling a head/neck pose role. For example, head/neck pose agent 1714 receives head/neck pose information from one more servos and/or sensors e.g., a head/neck motion sensor 506. Head/neck pose agent 1714, a source, sends the head or neck pose information, in processor readable or machine readable form, to second sub-plurality of agents 1704 via routes 1708*b*. The body or appendage pose information and the head or neck pose information is sent to servos agent 1722, a destination, in second sub-plurality of agents 1704. In various implementations, the information, like body or appendage pose information, is sent in an event driven way.

First sub-plurality of agents 1702 includes a display agent 1716 associated with a display in an operator interface, e.g., left/right visual display 504 in operator interface 500. Display agent 1716 receives images from one or more agent in second sub-plurality of agents 1704 via routes 1708*b*. For example, display agent 1716 receives a first polarity of images from a left imager agent 1724 and a second plurality of images from a right imager agent 1726. Left imager agent 1724 and right imager agent 1726 agent are associated with one or more imagers on a robot, e.g., camera 436 and camera 437 on robot 400.

First sub-plurality of agents 1702 further includes an audio (interface) agent 1718. Audio (interface) agent 1718 receives audio input from one or more microphones and sends the audio input to the input terminal of audio (robot) agent 1728 included in the second sub-plurality of agents 1704. The audio (robot) agent 1728 receives audio input from one or more microphones and sends the audio to the input port of audio (interface) agent 1718. The audio is exchanged via routes 1708*b*.

Second sub-plurality of agents 1704 includes a supervisor agent 1720 for the further agents in second sub-plurality of agents 1704. Supervisor agent 1720 is in communication with agents 1722 through 1728 via routes 1708*c*.

The second sub-plurality of agents 1704 includes the servos agent 1722, left imager agent 1724, right imager agent 1726, and audio (robot) agent 1728. The routes 1708*b* couple first sub-plurality of agents 1702 and second sub-plurality of agents 1704.

The third sub-plurality of agents 1706 includes an artificial intelligence agent 1730. The routes 1708*d* couple an artificial intelligence agent 1730 and the second sub-plurality of agents 1704.

The second sub-plurality of agents 1704 can be controlled by the first sub-plurality of agents 1702. That is via agents 1710, 1712, etc., and routes 1708*b*. The control can ultimately come from a human operator at an operator interface associated with the first sub-plurality of agents 1702. However, the first sub-plurality of agents 1702 could be stopped, e.g., made inactive, turned off, suspended. The third sub-plurality of agents 1706 could control the second sub-plurality of agents 1704 via routes 1708*d*. The routes 1708 can be dynamic, switching as agents are started or stopped, e.g., enter inactive state or active state. For example, in some instances plurality of agents 1700 could include the first sub-plurality of agents 1702 and the second sub-plurality of agents 1704. In some instances, the plurality of agents 1700 could include the third sub-plurality of agents 1706 and the second sub-plurality of agents 1704. One or more agents can be stopped or started by label. Examples of methods to stop or start agents, e.g., set to inactive or active state, by labels are shown and described with respect to, at least, FIGS. 11A and 11B. When one or more agents are stopped the routes incident from and to the one or more agents are stopped, e.g., made inactive. Agents may be persistent, and may be transitioned between an active state and an inactive state. When one or more agents are started, e.g., placed in active state, the routes incident from and to the one or more agents are started, e.g., active.

Artificial intelligence agent 1730, an example of an agent, is an assembly that may control a robot to engage in a game of "Simon Says . . . ", e.g., "Simon says raise your right hand". The game is also known as "سلمان يقول" (Salman says) in Iraq, "Jean dit" (John says) in Quebec, " Саймон говорить " (Saymon hovoryt, Simon says) in Ukriane, etc.

Artificial intelligence agent 1730 receives audio from audio (robot) agent 1728 and processes it to direct servos agent 1722. To play Simon Says the artificial intelligence agent 1730 does not need images from the robot. The artificial intelligence agent 1730 may be replaced with a human operator at an operator interface including agents, such as, first sub-plurality of agents 1702.

For an operator controlled mode, such as, an operator controlled participation in the game Simon Says, a controller may set the first sub-plurality of agents 1702 to active state and third sub-plurality of agents 1706 to inactive state. For an automated or AI controlled mode, such as, an AI controlling a robot during participation in the game Simon Says, a controller may set the third sub-plurality of agents 1706 to active state and first sub-plurality of agents 1702 to inactive state. Routes 1708 are dynamically reconfigured to pass messages between agents in active state.

A specification may, for example, take the form of a manifest of agents or for that matter a manifest of instances of the agents.

The above description of illustrated examples, implementations, and embodiments, including what is described in the Abstract, is not intended to be exhaustive or to limit the embodiments to the precise forms disclosed. Although specific examples are described herein for illustrative purposes, various equivalent modifications can be made without departing from the spirit and scope of the disclosure, as will be recognized by those skilled in the relevant art. The teachings provided herein of the various embodiments can be applied to many computer systems, robotic systems, and robots, not necessarily the exemplary computer systems, robotic systems, and robots herein and generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each act and/or operation within such block diagrams, flowcharts, or examples can be implemented, individually and/or collectively, by a wide range of hardware, software, firmware, or virtually any combination thereof. In some embodiments, the present subject matter is implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the source code for the software and or firmware would be well within the skill of one of ordinary skill in the art in light of the teachings of this disclosure. For example, those skilled in the relevant art can readily create source based on the flowcharts of the figures herein, including FIGS. 6, 7, 8A, 8B, 9, 10A, 10B, 11A, 11B, 12, 13, 14, and the detailed description provided herein.

As used herein processor-executable instructions and/or data can be stored on any non-transitory computer-readable storage medium, e.g., memory or disk, for use by or in connection with any processor-related system or method. In the context of this specification, a "computer-readable storage medium" is one or more tangible non-transitory computer-readable storage medium or element that can store processes-executable instruction and/or processor-readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus, device, or articles of manufacture. Processor-executable instructions are readable by a processor. More specific examples (a non-exhaustive list) of the computer-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory storage media.

Many of the methods described herein can be performed with variations. For example, many of the methods may include additional acts, omit some acts, and/or perform acts in a different order than as illustrated or described.

The various examples, implementations, and embodiments described above can be combined to provide further embodiments. Aspects of the embodiments can be modified, if necessary, to employ systems, circuits, devices, methods, and concepts in various patents, applications, and publications to provide yet further embodiments.

These and other changes can be made to the examples, implementations, and embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
at least one processor;
at least one non-transitory computer-readable storage media in communication with the at last one processor, and which stores at least one of processor-executable instructions or data thereon which when executed causes the at least one processor to:
define a first plurality of agents, wherein a respective agent in the first plurality of agents can be in an active state or an inactive state,
define a second plurality of agents, wherein a respective agent in the second plurality of agents can be in an active state or an inactive state,
define a third plurality of agents, wherein a respective agent in the third plurality of agents can be in an active state or an inactive state,
define a first plurality of routes disposed between, providing communication between, the first plurality of agents and the second plurality of agents, wherein a respective agent in the first plurality of routes can be in an active state or an inactive state,
define a second plurality of routes disposed between, providing communication between, the third plurality of agents and the second plurality of agents, wherein a respective agent in the second plurality of routes can be in an active state or an inactive state,
receive information that specifies a requested plurality of agents to change to a requested state wherein:

the requested state is an active state or an inactive state, and the first plurality of agents includes the requested plurality of agents or the third plurality of agents includes the requested plurality of agents, change the requested plurality of agents to the requested state, dynamically change the state of the first plurality of routes, the second plurality of routes, or the first plurality of routes and the second plurality of routes, and send event information through the first plurality of routes, or the a second plurality of routes.

2. The system of claim 1, further comprising:

a first processor-based device including a first processor;

a second processor-based device including a second processor; and wherein the at least one processor includes the first processor, and the second processor.

3. The system of claim 2 wherein:

the first processor-based device is a robot; and the second processor-based device is an operator interface.

4. The system of claim 2 wherein, when executed, the processor-executable instructions further cause the at least one processor to:

define a first host agent for the first processor-based device; and define a second host agent for the second processor-based device.

5. The system of claim 1 wherein, when executed, the processor-executable instructions further cause the at least one processor to:

attempt to locate the first plurality of agents.

6. The system of claim 5 wherein, when executed, the processor-executable instructions further cause the at least one processor to:

if the at least one processor does not locate the first plurality of agents, start the first plurality of agents.

7. The system of claim 1 wherein, when executed, the processor-executable instructions further cause the at least one processor to:

have the first plurality of agents to fill a first at least one role;

have the second plurality of agents to fill a second at least one role; and have the third plurality of agents to fill a third at least one role.

8. The system of claim 1 wherein, when executed, the processor-executable instructions further cause the at least one processor to:

define a blueprint including information that specifies:

the first at least one role, the second at least one role, and the third at least one role.

9. The system of claim 1 wherein, when executed, the processor-executable instructions further cause the at least one processor to:

define a supervisor agent for the first plurality of agents, the second plurality of agents, or the third plurality of agents.

10. The system of claim 1 wherein, when executed, the processor-executable instructions further cause the at least one processor to:

receive event information that represents an event;

send the event information to at least one of the first plurality of agents, the second plurality of agents, or the third plurality of agents; and process the event information.

\* \* \* \* \*